(12) United States Patent
Lee et al.

(10) Patent No.: US 11,444,305 B2
(45) Date of Patent: Sep. 13, 2022

(54) POLYMER ELECTROLYTE MEMBRANE, METHOD FOR MANUFACTURING SAME, AND MEMBRANE ELECTRODE ASSEMBLY COMPRISING SAME

(71) Applicant: Kolon Industries, Inc., Seoul (KR)

(72) Inventors: Dong-Hoon Lee, Seoul (KR); Na-Young Kim, Seoul (KR); Jung-Hwa Park, Seoul (KR); Eun-Su Lee, Seoul (KR)

( * ) Notice: Subject to any disclaimer, the term of this patent is extended or adjusted under 35 U.S.C. 154(b) by 274 days.

(21) Appl. No.: 16/646,271

(22) PCT Filed: Sep. 27, 2018

(86) PCT No.: PCT/KR2018/011372
§ 371 (c)(1),
(2) Date: Mar. 11, 2020

(87) PCT Pub. No.: WO2019/066460
PCT Pub. Date: Apr. 4, 2019

(65) Prior Publication Data
US 2020/0287230 A1     Sep. 10, 2020

(30) Foreign Application Priority Data

Sep. 29, 2017  (KR) .................. 10-2017-0127807
Sep. 20, 2018  (KR) .................. 10-2018-0113238

(51) Int. Cl.
*H01M 8/1053*   (2016.01)
*B01J 43/00*    (2006.01)
(Continued)

(52) U.S. Cl.
CPC ........... *H01M 8/1053* (2013.01); *B01J 43/00* (2013.01); *B01J 47/12* (2013.01); *C08J 5/005* (2013.01);
(Continued)

(58) Field of Classification Search
CPC ........ B01J 43/00; B01J 47/12; C08J 2327/12; C08J 2365/02; C08J 2371/12;
(Continued)

(56) References Cited

U.S. PATENT DOCUMENTS 9,212,246 B1    12/2015  Yadav
2009/0155662 A1  6/2009  Durante et al.
2017/0179514 A1  6/2017  Bae et al.

FOREIGN PATENT DOCUMENTS

EP   3185345 A2   6/2017
EP   3719904 A1   10/2020
(Continued)

OTHER PUBLICATIONS

Machine Translation WO2015125695A1 (Year: 2015).*
(Continued)

*Primary Examiner* — Victoria H Lynch
(74) *Attorney, Agent, or Firm* — Harvest IP Law, LLP

(57) ABSTRACT

Disclosed are a polymer electrolyte membrane, a method of manufacturing the membrane, and a membrane-electrode assembly including the membrane. The polymer electrolyte membrane contains a porous support having a plurality of pores, a first layer including a first ion conductor that fills the pores adjoining one surface of the porous support, and a second layer including a second ion conductor that fills the pores adjoining the other surface of the porous support, wherein the first ion conductor and the second ion conductor are different from each other, and one selected from the group consisting of the first layer, the second layer, and a combination thereof includes an organic-based antioxidant.

14 Claims, 7 Drawing Sheets

(51) Int. Cl.
*B01J 47/12* (2017.01)
*C08J 5/00* (2006.01)
*C08J 5/22* (2006.01)
*C08J 9/42* (2006.01)
*H01M 8/1004* (2016.01)
*H01M 8/1027* (2016.01)
*H01M 8/1039* (2016.01)
*H01M 8/1058* (2016.01)
*H01M 8/1069* (2016.01)
*C08J 5/24* (2006.01)
*H01M 8/10* (2016.01)

(52) U.S. Cl.
CPC ............ *C08J 5/2281* (2013.01); *C08J 5/2293* (2013.01); *C08J 5/246* (2021.05); *C08J 9/42* (2013.01); *H01M 8/1004* (2013.01); *H01M 8/1027* (2013.01); *H01M 8/1039* (2013.01); *H01M 8/1058* (2013.01); *H01M 8/1069* (2013.01); *C08J 2365/02* (2013.01); *C08J 2371/12* (2013.01); *C08J 2379/08* (2013.01); *C08J 2471/12* (2013.01); *H01M 2008/1095* (2013.01); *H01M 2300/0082* (2013.01); *H01M 2300/0094* (2013.01)

(58) Field of Classification Search
CPC ................... C08J 2379/08; C08J 2427/12; C08J 2471/12; C08J 2479/08; C08J 5/005; C08J 5/2262; C08J 5/2281; C08J 5/2293; C08J 5/24; C08J 9/42; H01M 2008/1095; H01M 2220/20; H01M 2300/0082; H01M 2300/0094; H01M 8/1004; H01M 8/1023; H01M 8/1027; H01M 8/1039; H01M 8/1051; H01M 8/1053; H01M 8/1058; H01M 8/1067; H01M 8/1069; Y02E 60/10; Y02E 60/50; Y02P 70/50

See application file for complete search history.

(56) References Cited

FOREIGN PATENT DOCUMENTS

| | | |
|---|---|---|
| EP | 3817114 A1 | 5/2021 |
| GB | 2464707 A | 4/2010 |
| JP | 07-135004 A | 5/1995 |
| JP | 2006054080 A | 2/2006 |
| JP | 2008027586 A | 2/2008 |
| JP | 2009-094010 A | 4/2009 |
| JP | 2011-508369 A | 3/2011 |
| JP | 2017114122 A | 6/2017 |
| KR | 10-2014-0082378 A | 7/2014 |
| KR | 10-1639536 B1 | 7/2016 |
| WO | 2009109780 A1 | 9/2009 |
| WO | 2014/104687 A1 | 7/2014 |
| WO | 2015125695 A1 | 8/2015 |

OTHER PUBLICATIONS

Machine Translation JPH07135004A (Year: 1995).*
JP OA dated Mar. 17, 2021.
EP search report dated May 25, 2021.
International Search Report for PCT/KR2018/011372 dated Jan. 23, 2019 (PCT/ISA/210).

* cited by examiner

POLYMER ELECTROLYTE MEMBRANE, METHOD FOR MANUFACTURING SAME, AND MEMBRANE ELECTRODE ASSEMBLY COMPRISING SAME

CROSS REFERENCE TO RELATED APPLICATIONS

This application is a National Stage of International Application No. PCT/KR2018/011372 filed Sep. 27, 2018, claiming priorities based on Korean Patent Application No. 10-2017-0127807 filed Sep. 29, 2017 and Korean Patent Application No. 10-2018-0113238 filed Sep. 20, 2018.

TECHNICAL FIELD

The present disclosure relates to a polymer electrolyte membrane, a method of manufacturing the same, and a membrane-electrode assembly including the same, and more particularly to a polymer electrolyte membrane, the shape stability of which is excellent and which has improved tolerance to radicals generated during the operation thereof, whereby the polymer electrolyte membrane exhibits high stability against radicals, i.e. high chemical stability, and hydrogen permeability is reduced while the ion conductivity of the polymer electrolyte membrane is excellent, a method of manufacturing the same, and a membrane-electrode assembly including the same.

BACKGROUND ART

A fuel cell, which is a cell including a power generation system for directly converting chemical reaction energy into electrical energy through an oxidation/reduction reaction of hydrogen and oxygen contained in a hydrocarbon-based fuel material, such as methanol, ethanol, or natural gas, has attracted attention as a next-generation clean energy source that is capable of replacing fossil energy due to the environmentally friendly characteristics thereof, such as high energy efficiency and reduced discharge of contaminants.

The fuel cell has an advantage in that unit cells are stacked to constitute a stack, whereby it is possible to provide various levels of power. In addition, the fuel cell has energy density 4 to 10 times as high as that of a small-sized lithium battery, whereby the fuel cell has attracted attention as a small-sized mobile power source.

The stack of the fuel assembly, which substantially generates electricity, has a structure in which several to several tens of unit cells, each of which includes a membrane-electrode assembly (MEA) and a separator (also referred to as a bipolar plate), are stacked. The membrane-electrode assembly is generally configured to have a structure in which an oxidation electrode (anode or fuel electrode) and a reduction electrode (cathode or air electrode) are formed at opposite sides of an electrode membrane in the state in which the electrode membrane is disposed therebetween.

The fuel cell may be classified as an alkaline electrolyte membrane fuel cell or a polymer electrolyte membrane fuel cell (PEMFC) depending on the state and kind of an electrolyte. The polymer electrolyte membrane fuel cell has attracted attention as a mobile power source, a power source for vehicles, and a power source for home use because of the low operating temperature lower than 100 r, rapid starting and response characteristics, and excellent durability thereof.

Representative examples of the polymer electrolyte membrane fuel cell may include a proton exchange membrane fuel cell (PEMFC), which uses hydrogen gas as fuel, and a direct methanol fuel cell (DMFC), which uses liquid methanol as fuel.

The reaction that occurs in the polymer electrolyte membrane fuel cell will be described in brief. First, when fuel such as hydrogen gas is supplied to the oxidation electrode, protons ($H^+$) and electrons ($e^-$) are generated at the oxidation electrode as the result of the oxidation reaction of hydrogen. The generated protons are transferred to the reduction electrode via the polymer electrolyte membrane, and the generated electrons are transferred to the reduction electrode via an external circuit. Oxygen is supplied from the reduction electrode, and oxygen is bonded with the protons and electrons, whereby water is generated through the reduction reaction of oxygen.

Meanwhile, there are many technical problems to be solved in order to realize the commercial use of the polymer electrolyte membrane fuel cell. In particular, it is required to realize high performance, a long lifespan, and a reduction in the price of the polymer electrolyte membrane fuel cell. The element that exerts the greatest influence thereon is the membrane-electrode assembly. In particular, the polymer electrolyte membrane is one of the core elements that exert the greatest influence on the performance and price of the MEA.

The requirements of the polymer electrolyte membrane necessary to operate the polymer electrolyte membrane fuel cell include high proton conductivity, high chemical stability, low fuel permeability, high mechanical strength, low moisture content, and excellent dimensional stability. A conventional polymer electrolyte membrane tends not to normally realize high performance under particular temperature and relative-humidity conditions, particularly under high-temperature/low-humidity conditions. As a result, a polymer electrolyte membrane fuel cell having the conventional polymer electrolyte membrane applied thereto is limited in the range in which the fuel cell is capable of being applied.

A polymer electrolyte membrane made of a perfluorine-based polymer material that is generally used in an existing fuel cell for transportation has low tolerance to radicals generated during the operation thereof, whereby stability against radicals, i.e. chemical stability, is low. In addition, a path for transferring protons is wide, whereby proton conductivity is high; however, the permeability of hydrogen, which is used as fuel, is high. In particular, a high-durability polymer electrolyte membrane that is capable of overcoming the above shortcomings is necessary for a fuel cell for commercial transportation, such as buses and trucks, which require high long-term stability.

DISCLOSURE

Technical Problem

It is an object of the present disclosure to provide a polymer electrolyte membrane, the shape stability of which is excellent and which has improved tolerance to radicals generated during the operation thereof, whereby the polymer electrolyte membrane exhibits high stability against radicals, i.e. high chemical stability, and hydrogen permeability is reduced while the ion conductivity of the polymer electrolyte membrane is excellent.

It is another object of the present disclosure to provide a method of manufacturing the polymer electrolyte membrane.

It is a further object of the present disclosure to provide a membrane-electrode assembly including the polymer electrolyte membrane.

Technical Solution

In accordance with an aspect of the present disclosure, there is provided a polymer electrolyte membrane comprising a porous support having a plurality of pores, a first layer including a first ion conductor that fills the pores adjoining one surface of the porous support, and a second layer including a second ion conductor that fills the pores adjoining the other surface of the porous support, wherein the first ion conductor and the second ion conductor are different from each other, and one selected from the group consisting of the first layer, the second layer, and a combination thereof includes an organic-based antioxidant.

The weight per unit volume of the antioxidant in the first layer and the weight per unit volume of the antioxidant in the second layer may be different from each other.

The weight per unit volume of the antioxidant in the layer in which the weight per unit volume of the antioxidant is larger may range from 30 mg/cm$^3$ to 4,000 mg/cm$^3$, and the weight per unit volume of the antioxidant in the layer in which the weight per unit volume of the antioxidant is smaller may range from 10 mg/cm$^3$ to 2,000 mg/cm$^3$.

The polymer electrolyte membrane may further include a first ion conductor layer disposed on one surface of the porous support, the first ion conductor layer including the first ion conductor, and a second ion conductor layer on the other surface of the porous support, the second ion conductor layer including the second ion conductor.

The weight per unit volume of the antioxidant in the first ion conductor layer may be greater than the weight per unit volume of the antioxidant in the first layer, and the weight per unit volume of the antioxidant in the second ion conductor layer may be greater than the weight per unit volume of the antioxidant in the second layer.

The weight per unit volume of the antioxidant may decrease or increase in the order of the first ion conductor layer, the first layer, the second layer, and the second ion conductor layer, so that the polymer electrolyte membrane has a concentration gradient of the antioxidant.

One selected from the group consisting of the first layer, the second layer, and the combination thereof may include the organic-based antioxidant, and one selected from the group consisting of the first layer, the second layer, and the combination thereof and not including the organic-based antioxidant may not include an antioxidant, or may include a metal-based antioxidant.

The organic-based antioxidant may be one selected from the group consisting of syringic acid, vanillic acid, protocatechuic acid, coumaric acid, caffeic acid, ferulic acid, chlorogenic acid, cynarine, gallic acid, and a mixture thereof.

The metal-based antioxidant may be one capable of decomposing a peroxide or radical, which is selected from the group consisting of a transition metal, a noble metal, an ion thereof, a salt thereof, an oxide thereof, and a mixture thereof.

The first ion conductor and the second ion conductor may have different equivalent weights (EWs).

Each of the first ion conductor and the second ion conductor may be a fluorinated polymer including a fluorinated carbon backbone and a side chain represented by Chemical Formula 1 below, and the first ion conductor and the second ion conductor may have different side-chain lengths.

—(OCF$_2$CFR$_f$)$_a$—O—(CF$_2$)$_b$—X        [Chemical Formula 1]

(In Chemical Formula 1 above, R$_f$ is respectively and independently one selected from a group consisting of F, Cl, and a perfluorinated alkyl group having a carbon number ranging from 1 to 10, X is an ion-exchanging group, a is a real number ranging from 0 to 3, and b is a real number ranging from 1 to 5.)

Each of the first ion conductor and the second ion conductor may be a polymer including a hydrophilic repeating unit and a hydrophobic repeating unit, and the first ion conductor and the second ion conductor may have different molar ratios of the hydrophilic repeating unit to the hydrophobic repeating unit.

The molar ratio of the hydrophilic repeating unit to the hydrophobic repeating unit of the first ion conductor may be higher than the molar ratio of the hydrophilic repeating unit to the hydrophobic repeating unit of the second ion conductor.

The ratio of the thickness of the first ion conductor to the thickness of the second ion conductor in the polymer electrolyte membrane may range from 9:1 to 1:9.

In accordance with another aspect of the present disclosure, there is provided a method of manufacturing a polymer electrolyte membrane, the method including preparing a porous support having a plurality of pores, filling the pores adjoining one surface of the porous support with a first ion conductor to form a first layer, and filling the pores adjoining the other surface of the porous support with a second ion conductor to form a second layer, wherein the first ion conductor and the second ion conductor are different from each other, and one selected from the group consisting of the first layer, the second layer, and a combination thereof includes an organic-based antioxidant.

In accordance with another aspect of the present disclosure, there is provided a membrane-electrode assembly including an anode, a cathode, and the polymer electrolyte membrane, the polymer electrolyte membrane being disposed between the anode and the cathode.

In accordance with a further aspect of the present disclosure, there is provided a fuel cell including the membrane-electrode assembly.

Advantageous Effects

The shape stability of the polymer electrolyte membrane according to the present disclosure is excellent, and the polymer electrolyte membrane has improved tolerance to radicals generated during the operation thereof. Consequently, the polymer electrolyte membrane exhibits high stability against radicals, i.e. high chemical stability. In addition, hydrogen permeability is reduced while the ion conductivity of the polymer electrolyte membrane is excellent.

BEST MODE

Figure 1:
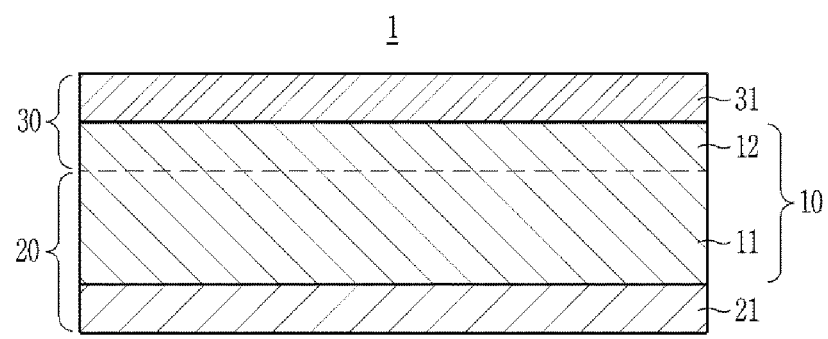
FIG. 1 is a sectional view schematically showing a polymer electrolyte membrane according to an embodiment of the present disclosure.

Hereinafter, embodiments of the present disclosure will be described in detail with reference to the accompanying drawings such that the embodiments of the present disclosure can be easily implemented by a person having ordinary skill in the art to which the present disclosure pertains. However, the present disclosure may be realized in various different forms, and is not limited to the embodiments described herein.

Unless particularly noted otherwise in this specification, an alkyl group includes a primary alkyl group, a second alkyl group, and a tertiary alkyl group, each of which is a straight-chain or branched-chain alkyl group having a carbon number ranging from 1 to 10, an alkyl halide group is a straight-chain or branched-chain alkyl halide group having a carbon number ranging from 1 to 10, an allyl group is an allyl group having a carbon number ranging from 2 to 10, an aryl group is an aryl group having a carbon number ranging from 6 to 30, an alkoxy group is an alkoxy group having a carbon number ranging from 1 to 10, an alkyl sulfonyl group is an alkyl sulfonyl group having a carbon number ranging from 1 to 10, an acyl group is an acyl group having a carbon number ranging from 1 to 10, and an aldehyde group is an aldehyde group having a carbon number ranging from 1 to 10.

Unless particularly noted otherwise in this specification, an amino group includes a primary amino group, a secondary amino group, and a tertiary amino group, and the secondary amino group or the tertiary amino group is an amino group having a carbon number ranging from 1 to 10.

Unless particularly noted otherwise in this specification, all compounds or substituent groups may be substituted or unsubstituted. Here, "substituted" means that hydrogen is substituted by any one selected from the group consisting of a halogen atom, a hydroxy group, a carboxyl group, a cyano group, a nitro group, an amino group, a thio group, a methylthio group, an alkoxy group, a nitrile group, an aldehyde group, an epoxy group, an ether group, an ester group, a carbonyl group, an acetal group, a ketone group, an alkyl group, a perfluoroalkyl group, a cycloalkyl group, a hetero-cycloalkyl group, an allyl group, a benzyl group, an aryl group, a heteroaryl group, a derivative thereof, and a combination thereof.

In this specification, * shown at opposite ends of a chemical formula indicates that the chemical moiety is connected to adjacent different chemical moieties.

In this specification, an ion conductor including a repeating unit represented as a general formula may include not only a repeating unit represented as a kind of chemical formula included in the general formula but also repeating units represented as various kinds of chemical formulas included in the general formula.

A polymer electrolyte membrane according to an embodiment of the present disclosure includes a porous support having a plurality of pores, a first layer including a first ion conductor that fills the pores adjoining one surface of the porous support, and a second layer including a second ion conductor that fills the pores adjoining the other surface of the porous support.

As an illustration, the porous support may include a highly fluorinated polymer having high resistance to thermal and chemical decomposition, preferably a perfluorinated polymer. For example, the porous support may include a copolymer of polytetrafluoroethylene (PTFE) or tetrafluoroethylene and $CF_2=CFC_nF_{2n+1}$ (n being a real number ranging from 1 to 5) or $CF_2=CFO-(CF_2CF(CF_3)O)_mC_nF_{2n+1}$ (m being a real number ranging from 0 to 15 and n being a real number ranging from 1 to 15).

The PTFE is commercially available, and may be appropriately used as the porous support. In addition, expanded polytetrafluoroethylene (e-PTFE), which has a polymer fibril microstructure or a microstructure in which nodes are connected to each other via fibrils, may also be appropriately used as the porous support, and a film having a polymer fibril microstructure in which no nodes are present may also be appropriately used as the porous support.

The porous support including the perfluorinated polymer is formed by extruding dispersion-polymerized PTFE into a tape in the presence of a lubricant and stretching the same. Consequently, it is possible to manufacture a porous support having higher porosity and higher strength. In addition, the e-PTFE may be thermally treated at a temperature exceeding the melting point (about 342° C.) of the PTFE, whereby it is possible to increase the amorphous content rate of PTFE. An e-PTFE film manufactured using the above method may have micropores having various diameters and porosities. The e-PTFE film manufactured using the above method may have a porosity of at least 35%, and the diameter of each of the micropores may be about 0.01 µm to 1 µm. In addition, the thickness of the porous support including the perfluorinated polymer may be variously changed. In an example, the thickness of the porous support may be 2 µm to 40 µm, preferably 5 µm to 20 µm. If the thickness of the porous support is less than 2 µm, the mechanical strength of the porous support may be remarkably reduced. If the thickness of the porous support is greater than 40 µm, on the other hand, the resistance loss of the porous support may be increased, and the light weight and integration of the porous support may be deteriorated.

As another illustration of the porous support, the porous support may be a nonwoven fibrous web including a plurality of fibers oriented at random.

The nonwoven fibrous web is a sheet that is interlaid but has a structure of individual fibers or filaments, rather than the same structure as woven cloth. The nonwoven fibrous web may be manufactured using a method selected from the group consisting of carding, garneting, air laying, wet laying, melt blowing, spun bonding, and stitch bonding.

The fiber may include one or more polymer materials. In general, any fiber-forming polymer material may be used. Specifically, a hydrocarbon-based fiber-forming polymer material may be used. For example, the fiber-forming polymer material may include, but is not limited to, polyolefin, such as polybutylene, polypropylene, or polyethylene; polyester, such as polyethylene terephthalate or polybutylene terephthalate; polyamide (nylon-6 or nylon-6,6); polyurethane; polybutene; polylactic acid; polyvinyl alcohol; polyphenylene sulfide; polysulfone; a liquid crystalline polymer; polyethylene-co-vinyl acetate; polyacrylonitrile; cyclic polyolefin; polyoxymethylene; a polyolefin-based thermoplastic elastomer; and a combination thereof.

As another illustration of the porous support having the form of the nonwoven fibrous web, the porous support may include a nanoweb in which nanofibers are integrated into the form of a nonwoven cloth including a plurality of pores.

A hydrocarbon-based polymer, which exhibits high chemical resistance and a hydrophobicity, whereby the hydrocarbon-based polymer is prevented from being deformed by moisture in a high-humidity environment, is preferably used as the nanofibers. Specifically, the hydrocarbon-based polymer may be selected from the group consisting of nylon, polyimide, polyaramid, polyetherimide, polyacrylonitrile, polyaniline, polyethylene oxide, polyethylene naphthalate, polybutylene terephthalate, styrene-butadiene rubber, polystyrene, polyvinyl chloride, polyvinyl alcohol, polyvinylidene fluoride, polyvinyl butylene, polyurethane, polybenzoxazole, polybenzimidazole, polyamide imide, polyethylene terephthalate, polyphenylene sulfide, polyethylene, polypropylene, a copolymer thereof, and a mixture thereof. Among them, polyimide, which exhibits higher thermal resistance, chemical resistance, and shape stability, is preferably used.

The nanoweb is an aggregate of nanofibers in which nanofibers manufactured by electrospinning are arranged randomly. At this time, it is preferable for the nanofibers to have an average diameter of 40 to 5000 nm in consideration of the porosity and thickness of the nanoweb when the diameters of 50 fibers are measured using a scanning electron microscope (JSM6700F, JEOL) and the average of the diameters of the fibers is calculated. If the average diameter of the nanofibers is less than 40 nm, the mechanical strength of the porous support may be reduced. If the average diameter of the nanofibers is greater than 5000 nm, the porosity of the porous support may be remarkably deteriorated, and the thickness of the porous support may be increased.

The thickness of the nonwoven fibrous web may be 10 μm to 50 μm, specifically 15 μm to 43 μm. If the thickness of the nonwoven fibrous web is less than 10 μm, the mechanical strength of the nonwoven fibrous web may be reduced. If the thickness of the nonwoven fibrous web is greater than 50 μm, on the other hand, the resistance loss of the nonwoven fibrous web may be increased, and the light weight and integration of the nonwoven fibrous web may be deteriorated.

The basic weight of the nonwoven fibrous web may range from 5 mg/cm$^2$ to 30 mg/cm$^2$. If the basic weight of the nonwoven fibrous web is less than 5 mg/cm$^2$, visible pores are formed in the nonwoven fibrous web, whereby it may be difficult to realize the function as the porous support. If the basic weight of the nonwoven fibrous web is greater than 30 mg/cm$^2$, the nonwoven fibrous web may be formed in the form of a paper or textile, which has few pores formed therein.

The porosity of the porous support may be 45% or more, specifically 60% or more. Meanwhile, it is preferable for the porous support to have a porosity of 90% or less. If the porosity of the porous support is greater than 90%, the shape stability of the porous support may be deteriorated, whereby subsequent processes may not be smoothly carried out. The porosity of the porous support may be calculated using Mathematical Expression 1 below based on the ratio of the volume of air to the overall volume of the porous support. At this time, the overall volume of the porous support may be calculated by manufacturing a rectangular sample and measuring the length, the width, and the thickness of the sample, and the volume of the air may be obtained by subtracting the volume of a polymer, back-calculated from the density thereof after measuring the mass of the sample, from the overall volume of the porous support.

$$\text{Porosity (\%)} = (\text{volume of air in porous support/overall volume of porous support}) \times 100 \quad \text{[Mathematical Expression 1]}$$

The polymer electrolyte membrane is a reinforced composite-membrane-type polymer electrolyte membrane in which the pores of the porous support are filled with an ion conductor.

At this time, the polymer electrolyte membrane may include a first ion conductor layer disposed at one surface of the porous support and a second ion conductor layer at the other surface of the porous support. The first ion conductor layer and the second ion conductor layer may be formed as the result of the surplus ion conductor filling the pores of the porous support forming a thin film on the surface of the porous support.

FIG. 1 is a sectional view schematically showing an illustration of the polymer electrolyte membrane 1.

Referring to FIG. 1, the polymer electrolyte membrane 1 includes a first layer 11 including a first ion conductor 20 that fills the pores adjoining one surface of the porous support 10 and a second layer 12 including a second ion conductor 30 that fills the pores adjoining the other surface of the porous support 10.

In addition, the polymer electrolyte membrane 1 may include a first ion conductor layer 21 disposed at one surface of the porous support 10 and a second ion conductor layer 31 at the other surface of the porous support 10. The first ion conductor layer 21 may include the first ion conductor 20, and the second ion conductor layer 31 may include the second ion conductor 30.

However, the present disclosure is not limited to FIG. 1, and the pores of the porous support 10 may be filled only with the first ion conductor 20 or the second ion conductor 30.

The polymer electrolyte membrane 1 may be formed by stacking a plurality of porous supports 10, each of which includes the first ion conductor 20 and the second ion conductor 30.

Figure 2:
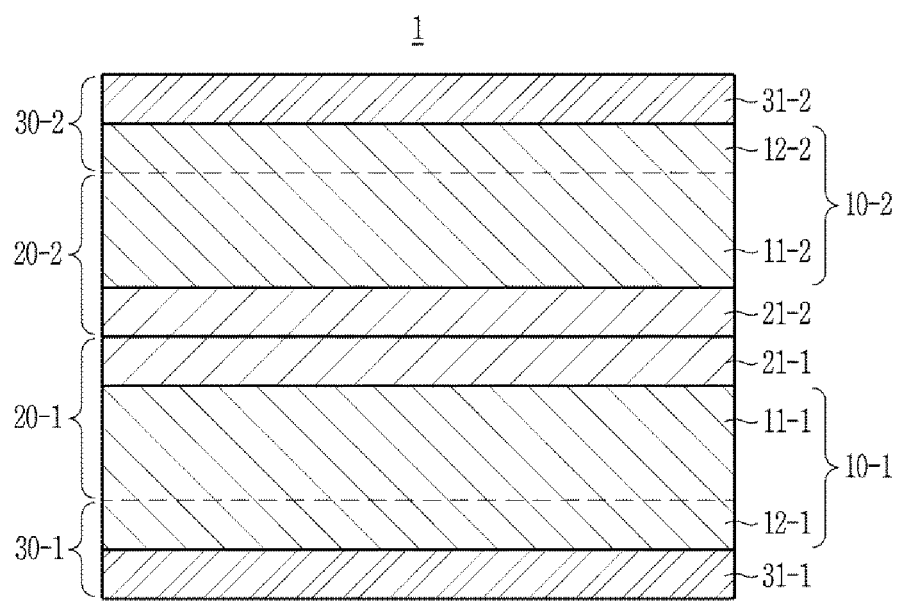
FIGS. 2 and 3 are sectional views each schematically showing a polymer electrolyte membrane formed by stacking a plurality of polymer electrolyte membranes, one of which is shown in FIG. 1.
Figure 3:
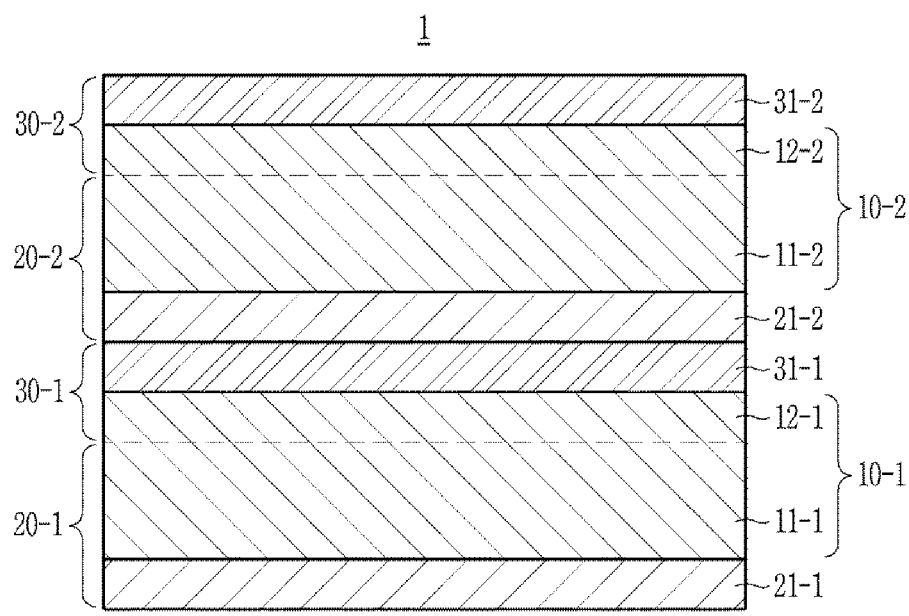

FIGS. 2 and 3 are sectional views each schematically showing a polymer electrolyte membrane 1 formed by stacking a plurality of porous supports 10.

Referring to FIGS. 2 and 3, the polymer electrolyte membrane 1 may be configured such that a first ion conductor 20-1 or a second ion conductor 30-1 of a first porous support 10-1 and a first ion conductor 20-2 or a second ion conductor 30-2 of a second porous support 10-2 are stacked so as to face each other. Specifically, FIG. 2 shows the case in which the first ion conductor 20-1 of the first porous support 10-1 and the first ion conductor 20-2 of the second porous support 10-2 are stacked so as to face each other, and FIG. 3 shows the case in which the second ion conductor 30-1 of the first porous support 10-1 and the first ion conductor 20-2 of the second porous support 10-2 are stacked so as to face each other.

The first ion conductor and the second ion conductor may be different from each other. Specifically, the first ion conductor and the second ion conductor may have different equivalent weights (EWs) or ion exchange capacities (IECs).

Specifically, the equivalent weight (EW) of the first ion conductor may range from 300 g/eq to 950 g/eq, specifically from 400 g/eq to 750 g/eq, and the equivalent weight (EW) of the second ion conductor may range from 650 g/eq to 1500 g/eq, specifically from 800 g/eq to 1100 g/eq. In addition, the ion exchange capacity (IEC) of the first ion conductor may range from 1.0 meq/g to 3.5 meq/g, specifically more than 1.3 meq/g and 2.5 meq/g or less, and the ion exchange capacity (IEC) of the second ion conductor may range from 0.6 meq/g to 1.6 meq/g, specifically from 0.9 meq/g to 1.3 meq/g.

That is, the first ion conductor may exhibit high ion conductivity efficiency, and the second ion conductor may secure the shape stability and durability of the polymer electrolyte membrane while reducing the swelling of the polymer electrolyte membrane.

Consequently, the first ion conductor may be introduced into one surface of the porous support in order to increase the ion conductivity performance of the polymer electrolyte membrane and to reduce membrane resistance, thereby improving the performance of a fuel cell, and the second ion conductor may be introduced into the other surface of the porous support in order to secure the shape stability of the polymer electrolyte membrane and to secure the durability of the polymer electrolyte membrane.

The thickness percentage of the first ion conductor layer may be 10 to 200 length %, specifically 50 to 100 length %, of the overall thickness of the porous support, and the thickness percentage of the second ion conductor layer may be 10 to 200 length %, specifically 50 to 100 length %, of the overall thickness of the porous support. If the thickness percentage of each of the first ion conductor layer and the second ion conductor layer is less than 10 length %, ion conductivity performance may not be realized. If the thickness percentage of each of the first ion conductor layer and the second ion conductor layer is greater than 200 length %, the porous support may not function as the support, and the durability of the porous support may be reduced in a manner similar to a single membrane. The thickness percentage of the ion conductor layer at one surface of the porous support may be calculated using Mathematical Expression 2.

Thickness percentage of ion conductor layer at one surface of porous support (length %)=(thickness of ion conductor layer at one surface of porous support/thickness of porous support)×100      [Mathematical Expression 2]

In consideration of the effects that are obtainable by introducing the first ion conductor and the second ion conductor, the ratio of the thickness of the first ion conductor to the thickness of the second ion conductor in the polymer electrolyte membrane may range from 9:1 to 1:9, specifically from 9:1 to 6:4, and more specifically from 8:2 to 6:4.

That is, in order to secure the shape stability of the polymer electrolyte membrane while improving the ion conductivity performance of the polymer electrolyte membrane, it is advantageous for the thickness of the first ion conductor to be greater than the thickness of the second ion conductor.

Here, the thickness of the first ion conductor is the sum of the thickness of the first ion conductor filling the pores of the porous support and the thickness of the first ion conductor layer. In the same manner, the thickness of the second ion conductor is the sum of the thickness of the second ion conductor filling the pores of the porous support and the thickness of the second ion conductor layer.

In addition, in consideration of the effects that are obtainable by introducing the first ion conductor and the second ion conductor, all of the pores of the porous support may be filled with the first ion conductor, the first ion conductor layer may be formed at one surface of the porous support, and the second ion conductor layer may be formed at the other surface of the porous support.

Meanwhile, each of the first ion conductor and the second ion conductor may be a cation conductor having a functional group for exchanging a cation such as a proton, or an anion conductor having a functional group for exchanging an anion such as hydroxyl ions, carbonate, or bicarbonate.

The cation-exchanging group may be one selected from the group consisting of a sulfonic acid group, a carboxyl group, a boronic acid group, a phosphate group, an imide group, a sulfoneimide group, a sulfoneamide group, a sulfonic acid fluoride group, and a combination thereof. In general, the cation-exchanging group may be a sulfonic acid group or a carboxyl group.

The cation conductor may include the cation-exchanging group, and may be a fluorine-based polymer including fluorine in the main chain thereof; a hydrocarbon-based polymer, such as benzimidazole, polyamide, polyamide imide, polyimide, polyacetal, polyethylene, polypropylene, acrylic resin, polyester, polysulfone, polyether, polyether imide, polyester, polyether sulfone, polyether imide, polycarbonate, polystyrene, polyphenylene sulfide, polyether ether ketone, polyether ketone, polyaryl ether sulfone, polyphosphazene, or polyphenyl quinoxaline; a partially fluorinated polymer, such as a polystyrene-graft-ethylene tetrafluoroethylene copolymer or a polystyrene-graft-polytetrafluoroethylene copolymer; or sulfone imide.

More specifically, in the case in which the cation conductor is a proton conductor, the polymer may include, in its side-chain, a cation-exchanging group selected from the group consisting of a sulfonic acid group, a carboxyl group, a phosphate group, a phosphonic acid group, and a derivative thereof, and the specific examples of the polymer may include, but are not limited to, a fluorine-based polymer including poly(perfluorosulfonic acid), poly(perfluorocarboxylic acid), a copolymer of tetrafluoroethylene and fluoro vinyl ether including a sulfonic acid group, defluorinated polyetherketone sulfide, and a mixture thereof; and sulfonated polyimide (S-PI), sulfonated polyarylether sulfone (S-PAES), sulfonated polyetheretherketone (S PEEK), sulfonated polybenzimidazole (SPBI), sulfonated polysulfone (S-PSU), sulfonated polystyrene (S-PS), sulfonated polyphosphazene, sulfonated polyquinoxaline, sulfonated polyketone, sulfonated polyphenylene oxide, sulfonated polyether sulfone, sulfonated polyether ketone, sulfonated polyphenylene sulfone, sulfonated polyphenylene sulfide, sulfonated polyphenylene sulfide sulfone, sulfonated polyphenylene sulfide sulfone nitrile, sulfonated polyarylene ether, sulfonated polyarylene ether nitrile, sulfonated polyarylene ether ether nitrile, sulfonated polyarylene ether sulfone ketone, and a mixture thereof.

The anion conductor is a polymer capable of transporting anions, such as hydroxyl ions, carbonate, or bicarbonate. The anion conductor is commercially available in the form of hydroxide or halide (generally chloride), and the anion conductor may be used in an industrial water purification, metal separation, or catalyst process.

A polymer doped with metal hydroxide may be generally used as the anion conductor. Specifically, poly(ether sulfone), polystyrene, a vinyl-based polymer, poly(vinyl chloride), poly(vinylidene fluoride), poly(tetrafluoroethylene), poly(benzimidazole), or poly(ethylene glycol), doped with metal hydroxide, may be generally used as the anion conductor.

Specifically, each of the first ion conductor and the second ion conductor may be a fluorinated polymer, specifically a highly fluorinated polymer including a highly fluorinated side chain. In order to increase the ion conductivity performance of the polymer electrolyte membrane while securing the shape stability of the polymer electrolyte membrane, as described above, the first ion conductor and the second ion conductor may have different side-chain lengths.

The term "highly fluorinated" means that at least 90 mol % of the total number of halogen and hydrogen atoms are substituted by fluorine atoms.

The highly fluorinated polymer may include a polymer backbone and circulating side-chains attached to the backbone, and each of the side-chains may include the ion-exchanging group. For example, the highly fluorinated polymer may be a copolymer of a first fluorinated vinyl monomer and a second fluorinated vinyl monomer having a sulfonic acid group.

The first fluorinated vinyl monomer may be tetrafluoroethylene (TFE), hexafluoropropylene, vinyl fluoride, vinylidene fluoride, trifluoroethylene, chlorotrifluoroethylene, perfluoro(alkyl vinyl ether), or a mixture thereof, and the second fluorinated vinyl monomer having the sulfonic acid group may be any of various fluorinated vinyl ethers each having a sulfonic acid group.

More specifically, the side chain may be represented by Chemical Formula 1 below.

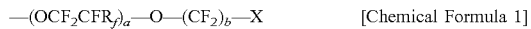

—(OCF$_2$CFR$_f$)$_a$—O—(CF$_2$)$_b$—X        [Chemical Formula 1]

In Chemical Formula 1 above, R$_f$ may be one selected from the group consisting of F, Cl, and a perfluorinated alkyl group having a carbon number ranging from 1 to 10, X may be the ion-exchanging group, specifically a sulfonic acid group, and a may be a real number ranging from 0 to 3, specifically from 0 to 1. b may be a real number ranging from 1 to 5, specifically from 2 to 4.

At this time, the side-chain length a+b of the first ion conductor may range from 2 to 6, specifically from 3 to 5, and the side-chain length a+b of the second ion conductor may range from 4 to 8, specifically more than 5 and 7 or less. If the side-chain length a+b of the first ion conductor is less than 2, the structural stability and chemical durability of the polymer electrolyte membrane may be reduced due to excessive absorption of moisture. If the side-chain length a+b of the first ion conductor is greater than 6, the ion conductivity and performance of the polymer electrolyte membrane may be reduced. If the side-chain length a+b of the second ion conductor is less than 4, the tensile strength, tensile elongation, and durability of the polymer electrolyte membrane may be reduced. If the side-chain length a+b of the second ion conductor is greater than 8, the ion conductivity and performance of the polymer electrolyte membrane may be reduced.

In addition, specifically, each of the first ion conductor and the second ion conductor may be a polymer including a hydrophilic repeating unit and a hydrophobic repeating unit, and the first ion conductor and the second ion conductor may have different molar ratios of the hydrophilic repeating unit to the hydrophobic repeating unit.

At least one monomer constituting the hydrophilic repeating unit may be substituted by the ion-exchanging group, and monomers constituting the hydrophobic repeating unit may not be substituted by the ion-exchanging groups, or may be substituted by a smaller number of ion-exchanging groups compared to the hydrophilic repeating unit. In addition, the hydrophilic repeating unit may include a monomer substituted by the ion-exchanging group and a monomer not substituted by the ion-exchanging group, although all the monomers constituting the hydrophilic repeating unit may include the ion-exchanging groups.

Each of the first ion conductor and the second ion conductor may be a random copolymer in which the hydrophilic repeating unit and the hydrophobic repeating unit are connected to each other at random, or may be a block copolymer including hydrophilic blocks constituted by the hydrophilic repeating units and hydrophobic blocks constituted by the hydrophobic repeating units.

More specifically, each of the first ion conductor and the second ion conductor may include a monomer in which the hydrophilic repeating unit is represented by Chemical Formula 2 below.

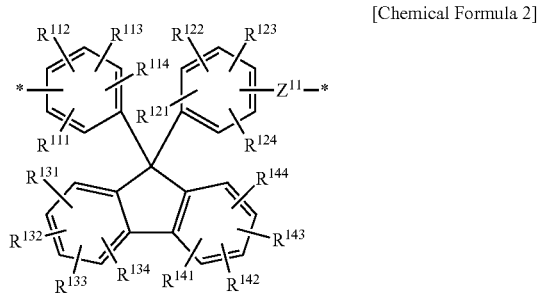

[Chemical Formula 2]

In Chemical Formula 2 above, each of $R^{111}$ to $R^{114}$, $R^{121}$ to $R^{124}$, $R^{131}$ to $R^{134}$, and $R^{141}$ to $R^{144}$ may respectively and independently be one selected from the group consisting of a hydrogen atom, a halogen atom, an ion-exchanging group, an electron-donating group, and an electron-withdrawing group.

The halogen atom may be one selected from the group consisting of bromine, fluorine, and chlorine.

The ion-exchanging group may be a cation-exchanging group selected from the group consisting of a sulfonic acid group, a carboxyl group, and a phosphate group, as described above. Preferably, the ion-exchanging group is a sulfonic acid group. In addition, the ion-exchanging group may be an anion-exchanging group such as an amine group.

In addition, the electron-donating group, which is an organic group that donates electrons, may be one selected from the group consisting of an alkyl group, an allyl group, an aryl group, an amino group, a hydroxyl group, and an alkoxy group, and the electron-withdrawing group, which is an organic group that withdraws electrons, may be one selected from the group consisting of an alkyl sulfonyl group, an acyl group, an alkyl halide group, an aldehyde group, a nitro group, a nitroso group, and a nitrile group.

The alkyl group may be a methyl group, an ethyl group, a propyl group, a butyl group, an isobutyl group, an amyl group, a hexyl group, a cyclohexyl group, or an octyl group. The alkyl halide group may be a trifluoromethyl group, a pentafluoroethyl group, a perfluoropropyl group, a perfluorobutyl group, a perfluoropentyl group, or a perfluorohexyl group. The allyl group may be a propenyl group. The aryl group may be a phenyl group or a pentafluorophenyl group. The perfluoroalkyl group may be an alkyl group in which some hydrogen atoms or all hydrogen atoms are substituted by fluorine.

$Z^{11}$, which is a two-valence organic group, may be —O— or —S—, preferably —O—.

Here, in order for the repeating unit including the monomer represented by Chemical Formula 2 to become the hydrophilic repeating unit, at least one of $R^{111}$ to $R^{114}$, $R^{121}$ to $R^{124}$, $R^{131}$ to $R^{134}$, and $R^{141}$ to $R^{144}$, in the monomer represented by Chemical Formula 2, may be an ion-exchanging group.

Specifically, the hydrophilic repeating unit may be represented by Chemical Formula 2-1 or Chemical Formula 2-2 below.

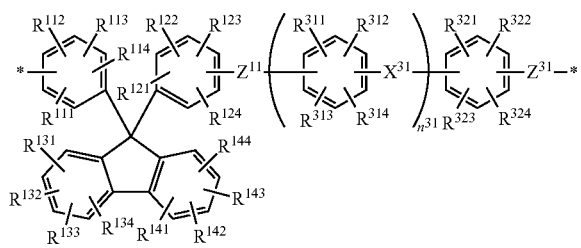

[Chemical Formual 2-2]

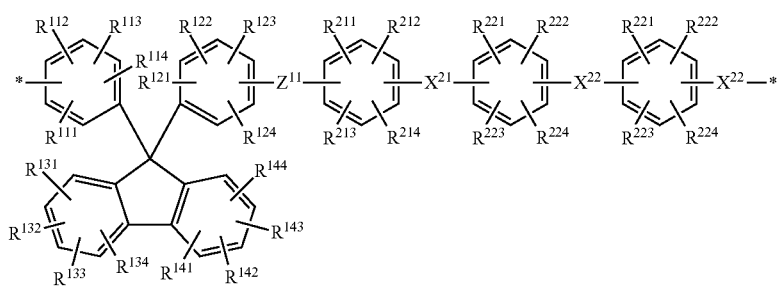

[Chemical Formula 2-1]

In Chemical Formula 2-1 above, $R^{111}$ to $R^{114}$, $R^{121}$ to $R^{124}$, $R^{131}$ to $R^{134}$, $R^{141}$ to $R^{144}$, and $Z^{11}$ are the same as described above, and therefore a duplicate description thereof is omitted.

$R^{211}$ to $R^{214}$, $R^{221}$ to $R^{224}$, and $R^{231}$ to $R^{234}$ may respectively and independently be one selected from the group consisting of a hydrogen atom; a halogen atom; an electron-donating group selected from the group consisting of an alkyl group, an allyl group, an aryl group, an amino group, a hydroxyl group, and an alkoxy group; and an electron-withdrawing group selected from the group consisting of an alkyl sulfonyl group, an acyl group, an alkyl halide group, an aldehyde group, a nitro group, a nitroso group, and a nitrile group. A detailed description of the substituent groups is the same as the above description, and therefore a duplicate description thereof will be omitted.

$X^{21}$ and $X^{22}$ may respectively and independently be a single bond or a two-valence organic group. The two-valence organic group is a two-valence organic group that withdraws or donates electrons. Specifically, the two-valence organic group may be one selected from the group consisting of —CO—, —$SO_2$—, —CONH—, —COO—, —$CR'_2$—, —$C(CH_3)_2$—, —$C(CF_3)_2$—, and —$(CH_2)_n$—. At this time, R' may be one selected from the group consisting of a hydrogen atom, a halogen atom, an alkyl group, and an alkyl halide group, and n may be a real number ranging from 1 to 10. In the case in which $X^{21}$ or $X^{22}$ is a single bond, it means that phenyl groups existing at both sides of X are directly connected thereto, and a typical example thereof may be a biphenyl group.

$Z^{21}$, which is a two-valence organic group, may be —O— or —S—, preferably —O—.

In Chemical Formula 2-2 above, $R^{111}$ to $R^{114}$, $R^{121}$ to $R^{124}$, $R^{131}$ to $R^{134}$, $R^{141}$ to $R^{144}$, and $Z^{11}$ are the same as described above, and therefore a duplicate description thereof is omitted.

$R^{311}$ to $R^{314}$ and $R^{221}$ to $R^{324}$ may respectively and independently be one selected from the group consisting of a hydrogen atom; a halogen atom; an ion-exchanging group; an electron-donating group selected from the group consisting of an alkyl group, an allyl group, an aryl group, an amino group, a hydroxyl group, and an alkoxy group; and an electron-withdrawing group selected from the group consisting of an alkyl sulfonyl group, an acyl group, an alkyl halide group, an aldehyde group, a nitro group, a nitroso group, and a nitrile group. The substituent groups are the same as described above, and therefore a duplicate description thereof is omitted.

$X^{31}$ may be a single bond or a two-valence organic group selected from the group consisting of —CO—, —$SO_2$—, —CONH—, —COO—, —$CR'_2$—, —$(CH_2)_n$—, a cyclohexylidene group, a cyclohexylidene group including an ion-exchanging group, a fluorenylidene group, a fluorenylidene group including an ion-exchanging group, —$C(CH_3)_2$—, —$C(CF_3)_2$—, —O—, and —S—. R' may be one selected from the group consisting of a hydrogen atom, a halogen atom, an alkyl group, and an alkyl halide group, and n may be a real number ranging from 1 to 10. The substituent groups are the same as described above, and therefore a duplicate description thereof is omitted.

Meanwhile, the cyclohexylidene group including the ion-exchanging group or the fluorenylidene group including the ion-exchanging group is a cyclohexylidene group or a fluorenylidene group, the hydrogen of which is substituted by an ion-exchanging group selected from the group consisting of a sulfonic acid group, a carboxyl group, a phosphate group, and a combination thereof.

$Z^{31}$, which is a two-valence organic group, may be —O— or —S—, preferably —O—.

$n^{31}$ may be a real number ranging from 1 to 10, preferably 0 or 1.

Meanwhile, the first ion conductor and the second ion conductor may respectively and independently include a monomer, the hydrophobic repeating unit of which is represented by Chemical Formula 3.

[Chemical Formula 3]

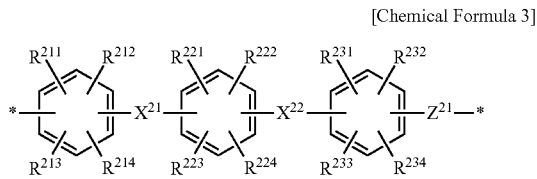

In Chemical Formula 3 above, $R^{211}$ to $R^{214}$, $R^{221}$ to $R^{224}$, $R^{231}$ to $R^{234}$, $X^{21}$, $X^{22}$, and $Z^{21}$ are the same as described above, and therefore a duplicate description thereof is omitted.

Specifically, the hydrophobic repeating unit may be represented by the following Chemical Formula 3-1.

[Chemical Formula 3-1]

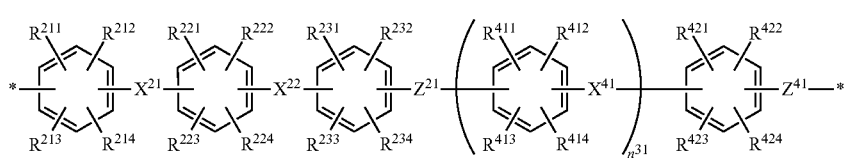

In Chemical Formula 3-1 above, $R^{211}$ to $R^{214}$, $R^{221}$ to $R^{224}$, $R^{231}$ to $R^{234}$, $X^{21}$, $X^{22}$, and $Z^{21}$ are the same as described above, and therefore a duplicate description thereof is omitted.

$R^{411}$ to $R^{414}$ and $R^{421}$ to $R^{424}$ may respectively and independently be one selected from the group consisting of a hydrogen atom; a halogen atom; an electron-donating group selected from the group consisting of an alkyl group, an allyl group, an aryl group, an amino group, a hydroxyl group, and an alkoxy group; and an electron-withdrawing group selected from the group consisting of an alkyl sulfonyl group, an acyl group, an alkyl halide group, an aldehyde group, a nitro group, a nitroso group, and a nitrile group. The substituent groups are the same as described above, and therefore a duplicate description thereof is omitted.

$X^{41}$ may be a single bond or a two-valence organic group selected from the group consisting of —CO—, —SO$_2$—, —CONH—, —COO—, —CR'$_2$—, —(CH$_2$)$_n$—, a cyclohexylidene group, a fluorenylidene group, —C(CH$_3$)$_2$—, —C(CF$_3$)$_2$—, —O—, and —S—. R' may be one selected from the group consisting of a hydrogen atom, a halogen atom, an alkyl group, and an alkyl halide group, and n may be a real number ranging from 1 to 10. The substituent groups are the same as described above, and therefore a duplicate description thereof is omitted.

$Z^{41}$, which is a two-valence organic group, may be —O— or —S—, preferably —O—.

$n^{41}$ may be a real number ranging from 1 to 10, preferably 0 or 1.

In addition, the first ion conductor and the second ion conductor may respectively and independently include a monomer, the hydrophobic repeating unit of which is represented by the following Chemical Formula 4.

[Chemical Formula 4]

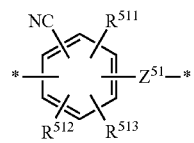

In Chemical Formula 4 above, $R^{511}$ to $R^{513}$ may respectively and independently be one selected from the group consisting of a hydrogen atom; a halogen atom; an electron-donating group selected from the group consisting of an alkyl group, an allyl group, an aryl group, an amino group, a hydroxyl group, and an alkoxy group; and an electron-withdrawing group selected from the group consisting of an alkyl sulfonyl group, an acyl group, an alkyl halide group, an aldehyde group, a nitro group, a nitroso group, and a nitrile group. The substituent groups are the same as described above, and therefore a duplicate description thereof is omitted.

$Z^{51}$, which is a two-valence organic group, may be —O— or —S—, preferably —O—.

Specifically, the hydrophobic repeating unit may be represented by the following Chemical Formula 4-1.

[Chemical Formula 4-1]

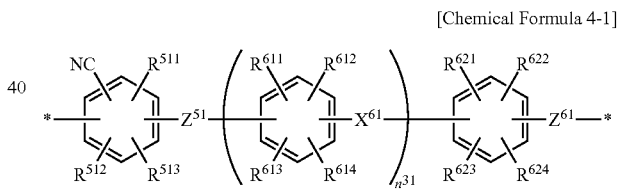

In Chemical Formula 4-1 above, $R^{511}$ to $R^{513}$ and $Z^{51}$ are the same as described above, and therefore a duplicate description thereof is omitted.

$R^{611}$ to $R^{614}$ and $R^{621}$ to $R^{624}$ may respectively and independently be one selected from the group consisting of a hydrogen atom; a halogen atom; an electron-donating group selected from the group consisting of an alkyl group, an allyl group, an aryl group, an amino group, a hydroxyl group, and an alkoxy group; and an electron-withdrawing group selected from the group consisting of an alkyl sulfonyl group, an acyl group, an alkyl halide group, an aldehyde group, a nitro group, a nitroso group, and a nitrile group. A detailed description of the substituent groups is the same as the above description, and therefore a duplicate description thereof will be omitted.

$X^{61}$ may be a single bond or a two-valence organic group selected from the group consisting of —CO—, —SO$_2$—, —CONH—, —COO—, —CR'$_2$—, —(CH$_2$)$_n$—, a cyclohexylidene group, a fluorenylidene group, —C(CH$_3$)$_2$—, —C(CF$_3$)$_2$—, —O—, and —S—. R' may be one selected from the group consisting of a hydrogen atom, a halogen atom, an alkyl group, and an alkyl halide group, and n may be a real number ranging from 1 to 10. The substituent groups are the same as described above description, and therefore a duplicate description thereof is omitted.

$Z^{61}$, which is a two-valence organic group, may be —O— or —S—, preferably —O—.

$n^{61}$ may be a real number ranging from 1 to 10, preferably 0 or 1.

Meanwhile, the hydrophobic repeating unit of each of the first ion conductor and the second ion conductor may be represented by Chemical Formula 5-1.

[Chemical Formula 5-1]

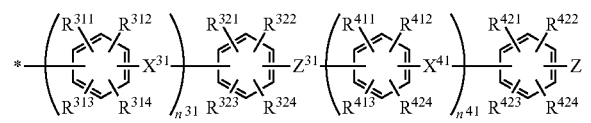

In Chemical Formula 5-1 above, $R^{311}$ to $R^{314}$, $R^{321}$ to $R^{324}$, $R^{411}$ to $R^{414}$, $R^{421}$ to $R^{424}$, $X^{31}$, $X^{41}$, $Z^{31}$, $Z^{41}$, $n^{31}$, and $n^{41}$ are the same as described above, and therefore a duplicate description thereof is omitted. Here, however, $X^{31}$ and $X^{41}$ may be different from each other.

In order for the repeating unit represented by Chemical Formula 3-1, Chemical Formula 4-1, and Chemical Formula 5-1 to become the hydrophobic repeating unit, it is preferable for $R^{211}$ to $R^{214}$, $R^{221}$ to $R^{224}$, $R^{231}$ to $R^{234}$, $R^{311}$ to $R^{314}$, $R^{321}$ to $R^{324}$, $R^{411}$ to $R^{414}$, $R^{421}$ to $R^{424}$, $R^{511}$ to $R^{513}$, $R^{611}$ to $R^{614}$, and $R^{621}$ to $R^{624}$, in the repeating unit represented by Chemical Formula 3-1, Chemical Formula 4-1, and Chemical Formula 5-1, to include substantially no ion-exchanging groups. Here, "include substantially no ion-exchanging groups" means that, while the substituent groups may include a small number of ion-exchanging groups, the number of ion-exchanging groups does not affect the phase separation between a hydrophilic region and a hydrophobic region.

Meanwhile, the first ion conductor and the second ion conductor may respectively and independently further include a monomer, the hydrophilic repeating unit or the hydrophobic repeating unit of which is represented by the following Chemical Formula 6.

In the case in which the first ion conductor or the second ion conductor further includes a monomer represented by Chemical Formula 6, the first ion conductor or the second ion conductor includes a nitrogen-containing aromatic ring group in the main chain thereof, whereby durability against radical attack and acid-based interaction are improved. In the first ion conductor or the second ion conductor, therefore, a phenomenon in which an addition reaction occurs in the aromatic ring of the polymer electrolyte membrane or the aromatic ring of the polymer electrolyte membrane is cut as the result of the attack of radicals formed at a cathode of the fuel cell during the operation of the fuel cell does not occur. In addition, the function of the ion-exchanging group is maximized, whereby the operation performance of the fuel cell in a low-humidity condition may be improved.

  [Chemical Formula 6]

In Chemical Formula 6 above, Z may be —O— or —S—, preferably —O—.

Y is a two-valence nitrogen-containing aromatic ring group. The nitrogen-containing aromatic ring group is a group in which at least one nitrogen atom, as a hetero atom, is included in the aromatic ring. In addition, an oxygen atom, a sulfur atom, and so on may be included in the aromatic ring as another hetero atom, in addition to the nitrogen atom.

Specifically, the two-valence nitrogen-containing aromatic ring group may be a two-valence group of any nitrogen-containing aromatic ring compound selected from the group consisting of pyrrole, thiazole, isothiazole, oxazole, isoxazole, imidazole, imidazoline, imidazolidine, pyrazole, triazine, pyridine, pyrimidine, pyridazine, pyrazine, indole, quinoline, isoquinoline, tetrazole, tetrazine, triazole, carbazole, quinoxaline, quinazoline, indolizine, isoindole, indazole, phthalazine, naphthyridine, bipyridine, benzimidazole, imidazole, pyrrolidine, pyrroline, pyrazoline, pyrazolidine, piperidine, piperazine, and indoline.

Each of the first ion conductor and the second ion conductor may have a weight average molecular weight of 10,000 mg/cmol to 1,000,000 mg/cmol, preferably 100,000 mg/cmol to 500,000 mg/cmol. If the weight average molecular weight of each of the first ion conductor and the second ion conductor is less than 100,000 mg/cmol, it may be difficult to form a uniform membrane, and the durability of the membrane may be reduced. If the weight average molecular weight of each of the first ion conductor and the second ion conductor is greater than 500,000 mg/cmol, solubility may be reduced.

In the case in which each of the first ion conductor and the second ion conductor is a hydrocarbon-based copolymer including a hydrophilic repeating unit and a hydrophobic repeating unit, as illustrated above, it is advantageous to use a hydrocarbon-based porous support as the porous support in terms of the stability of the polymer electrolyte membrane. Specifically, in the case in which a porous support and an ion conductor having different properties are combined, for example, in the case in which a fluorine-based porous support and a hydrocarbon-based ion conductor are combined, the ion conductor may be easily separated or discharged from the porous support, or impregnation efficiency may be reduced.

The hydrophilic repeating unit and the hydrophobic repeating unit may be individually manufactured, and then nucleophilic substitution reaction may be performed in the hydrophilic repeating unit and the hydrophobic repeating unit in order to manufacture each of the first ion conductor and the second ion conductor.

In addition, the hydrophilic repeating unit and the hydrophobic repeating unit may also be manufactured through a nucleophilic substitution reaction. For example, in the case in which the hydrophilic repeating unit is a repeating unit represented by Chemical Formula 2-2, the hydrophilic repeating unit may be manufactured through aromatic nucleophilic substitution reaction of an active dihalide monomer and an active dihydroxy monomer, which are two ingredients constituting the repeating unit represented by Chemical Formula 2-2. In the case in which the hydrophobic repeating unit is a repeating unit represented by Chemical Formula 3-1, the hydrophobic repeating unit may be manufactured through an aromatic nucleophilic substitution reaction of an active dihalide monomer and an active dihydroxy monomer, which are two ingredients constituting the repeating unit represented by Chemical Formula 3-1.

In an example, in the case in which the hydrophilic repeating unit is a repeating unit represented by Chemical Formula 2-2, the hydrophilic repeating unit may be manufactured through a nucleophilic substitution reaction of SDCDPS (sulfonated dichlorodiphenyl sulfone), SDFDPS (sulfonated difluorodiphenyl sulfone), SDCDPK (sulfonated dichlorodiphenyl ketone), DCDPS (dichlorodiphenyl sulfone), DFDPS (difluorodiphenyl sulfone or bis-(4-fluorophenyl)-sulfone), or DCDPK (dichlorodiphenyl ketone), as the active dihalide monomer, and SHPF (sulfonated 9,9'-bis(4-hydroxyphenyl)fluorine or sulfonated 4,4'-(9-Fluorenylidene biphenol)) or HPF (9,9'-bis(4-hydroxyphenyl)fluorine or 4,4'-(9-fluorenylidene biphenol)), as the active dihydroxy monomer.

In addition, in the case in which the hydrophobic repeating unit is a repeating unit represented by Chemical Formula 3-1, the hydrophobic repeating unit may be manufactured through a nucleophilic substitution reaction of 1,3-bis(4-fluorobenzoyl)benzene, as the active dihalide monomer, and DHDPS (dihydroxydiphenyl sulfone), DHDPK (dihydroxydiphenyl ketone or dihydroxybenzophenone), or BP (4,4'-biphenol), as the active dihydroxy monomer.

In addition, in the case in which the hydrophobic repeating unit is a repeating unit represented by Chemical Formula 4-1, the hydrophobic repeating unit may be manufactured through a nucleophilic substitution reaction of 2,6-difluorobenzonitrile, as the active dihalide monomer, and DHDPS (dihydroxydiphenyl sulfone), DHDPK (dihydroxydiphenyl ketone or dihydroxybenzophenone), or BP (4,4'-biphenol), as the active dihydroxy monomer.

In the same manner, even in the case in which a nucleophilic substitution reaction is performed between the manufactured hydrophilic repeating unit and the manufactured hydrophobic repeating unit, control may be performed such that opposite ends of the hydrophilic repeating unit are hydroxyl groups and the opposite ends of the hydrophobic repeating unit are halide groups, or control may be performed such that opposite ends of the hydrophobic repeating unit are hydroxyl groups and the opposite ends of the hydrophilic repeating unit are halide groups, whereby a nucleophilic substitution reaction may be performed between the hydrophilic repeating unit and the hydrophobic repeating unit.

At this time, it is preferable to perform the nucleophilic substitution reaction in the presence of an alkaline compound. Specifically, the alkaline compound may be sodium hydroxide, potassium hydroxide, sodium carbonate, potassium carbonate, or sodium hydrogen carbonate, which may be used either alone or in a combination of two or more materials.

In addition, the nucleophilic substitution reaction may be performed in a solvent. Specifically, the solvent may be an aprotic polar solvent, such as N-dimethyl acetamide, N,N-dimethyl formamide, N-methyl-2-pyrrolidone, dimethyl sulfoxide, sulfolane, or 1,3-dimethyl-2-imidazolidinone, which may be used either alone or in a combination of two or more materials.

At this time, a solvent, such as benzene, toluene, xylene, hexane, cyclohexane, octane, chlorobenzene, dioxane, tetrahydrofuran, anisole, or phenetole, may coexist with the aprotic solvent.

Optionally, a step of introducing an ion-exchanging group into the first ion conductor and the second ion conductor may be further included. In an example, in the case in which the ion-exchanging group is a sulfonic acid group, which is a cation-exchanging group, the step of introducing the ion-exchanging group into the ion conductor may be performed through the following two methods.

First, a method of performing polymerization using a monomer including an ion-exchanging group at the time of manufacturing the hydrophilic repeating unit of each of the first ion conductor and the second ion conductor such that the ion-exchanging group is introduced into the manufactured polymer may be used. In this case, SDCDPS (sulfonated dichlorodiphenyl sulfone), SDFDPS (sulfonated difluorodiphenyl sulfone), SDCDPK (sulfonated dichlorodiphenyl ketone), or SHPF (sulfonated 9,9'-bis(4-hydroxyphenyl)fluorine or sulfonated 4,4'-(9-fluorenylidene biphenol)), which includes an ion-exchanging group, may be used as the monomer for a nucleophilic substitution reaction.

Also, in this case, a method of reacting a monomer having a sulfonic acid ester group, instead of the sulfonic acid group, to manufacture the polymer having the sulfonic acid ester group and diesterifying the sulfonic acid ester group to convert the sulfonic acid ester group into a sulfonic acid group may also be used.

Second, a polymer may be manufactured using a monomer including no ion-exchanging group, and then the polymer may be sulfonated using a sulfonation agent such that an ion-exchanging group is introduced into the hydrophilic repeating unit.

Sulfuric acid may be used as the sulfonation agent. In another example, the manufactured polymer may be reacted in a chlorinated solvent, such as dichloromethane, chloroform, or 1,2-dichloroethane, in the presence of excessive chlorosulfonic acid (1 to 10 times, preferably 4 to 7 times, the overall weight of the polymer) in order to manufacture an ion conductor exhibiting proton conductivity.

In the case in which each of the first ion conductor and the second ion conductor includes a sulfonic acid group as an ion-exchanging group, the degree of sulfonation of the ion conductor may range from 1 to 100 mole %, preferably from 50 to 100 mole %. That is, the ion conductor may be sulfonated 100 mole % at a site in which the ion conductor is capable of being sulfonated. Even in the case in which the ion conductor is sulfonated 100 mole %, the dimensional stability and durability of the ion conductor are not reduced due to the structure of the block copolymer of the ion conductor. In addition, when the degree of sulfonation of the ion conductor is within the above range, the ion conductor may exhibit high ion conductivity without a reduction in the dimensional stability thereof.

In the case in which each of the first ion conductor and the second ion conductor includes the hydrophilic repeating unit and the hydrophobic repeating unit, the hydrophilic repeating unit and the hydrophobic repeating unit may be primarily synthesized in an oligomer state, and then the hydrophilic repeating unit and the hydrophobic repeating unit may be synthesized so as to have a desired molar ratio, whereby the structure of the ion conductor may be easily controlled and thus the properties of the ion conductor may be easily controlled. In the ion conductor, the structure of which is controlled as described above, micro-scale phase separation may be achieved between the hydrophilic repeating unit and the hydrophobic repeating unit, whereby it is possible to provide an ion conductor having improved ion conductivity and durability throughout an entire humidification range.

Here, the molar ratio of the hydrophobic repeating unit to the hydrophilic repeating unit means the number of moles of the hydrophobic repeating unit included in the first or second ion conductor per one mole of the hydrophilic repeating unit. The molar ratio of the hydrophilic repeating unit to the hydrophobic repeating unit in each of the first and second ion conductors may be 1:0.5 to 1:10, specifically 1:1 to 1:5, and more specifically 1:more than 1.2 to 1:5. If the molar ratio of the hydrophobic repeating unit is less than 0.5, the moisture content of the ion conductor may be increased, whereby the dimensional stability and durability of the ion conductor may be reduced. If the molar ratio of the hydrophobic repeating unit is greater than 10, the desired ion conductivity performance of the ion conductor may not be realized.

Since the first ion conductor and the second ion conductor include different repeating units, the molar ratio of the hydrophilic repeating unit to the hydrophobic repeating unit of the first ion conductor may be different from the molar ratio of the hydrophilic repeating unit to the hydrophobic repeating unit of the second ion conductor. Even in the case in which the first ion conductor and the second ion conductor include the same repeating units, the molar ratio of the hydrophilic repeating unit to the hydrophobic repeating unit of the first ion conductor may be different from the molar ratio of the hydrophilic repeating unit to the hydrophobic repeating unit of the second ion conductor. That is, the first ion conductor and the second ion conductor may be configured such that the molar ratio of the hydrophilic repeating unit to the hydrophobic repeating unit of the first ion conductor is different from the molar ratio of the hydrophilic repeating unit to the hydrophobic repeating unit of the second ion conductor, whereby the performance of the first ion conductor and the second ion conductor may be differently realized.

Here, the first ion conductor may be an ion conductor configured such that the molar ratio of the hydrophilic repeating unit to the hydrophobic repeating unit thereof is higher than the molar ratio of the hydrophilic repeating unit to the hydrophobic repeating unit of the second ion conductor.

Specifically, the molar ratio of the hydrophilic repeating unit to the hydrophobic repeating unit of the first ion conductor may be 1:2 to 1:5, specifically 1:2 to 1:3, and the molar ratio of the hydrophilic repeating unit to the hydrophobic repeating unit of the second ion conductor may be 1:3 to 1:6, specifically 1:3 to 1:4. Even in the case in which the range of the molar ratio of the hydrophilic repeating unit to the hydrophobic repeating unit of the first ion conductor and the range of the molar ratio of the hydrophilic repeating unit to the hydrophobic repeating unit of the second ion conductor overlap each other, the molar ratio of the hydrophilic repeating unit to the hydrophobic repeating unit of the first ion conductor may be higher than the molar ratio of the hydrophilic repeating unit to the hydrophobic repeating unit of the second ion conductor.

That is, in the case in which a polymer electrolyte membrane is manufactured using an ion conductor having a relatively high molar ratio of the hydrophilic repeating unit, like the first ion conductor, it is possible to obtain a polymer electrolyte membrane having high ion conductivity.

In the case in which the polymer electrolyte membrane is manufactured using an ion conductor having a relatively high molar ratio of the hydrophobic repeating unit, like the second ion conductor, it is possible to secure the shape stability and durability of the polymer electrolyte membrane while reducing swelling of the polymer electrolyte membrane.

Consequently, the first ion conductor, the molar ratio of the hydrophilic repeating unit of which is relatively high, may be introduced into one surface of the porous support in order to increase the ion conductivity performance of the polymer electrolyte membrane and to reduce membrane resistance, and the second ion conductor, the molar ratio of the hydrophobic repeating unit of which is relatively high, may be introduced into the other surface of the porous support in order to secure the shape stability of the polymer electrolyte membrane.

Meanwhile, one selected from the group consisting of the first layer, the second layer, the first ion conductor layer, and the second ion conductor layer may further include an antioxidant.

Since the reduction reaction of oxygen at a cathode electrode of a polymer electrolyte membrane fuel cell is performed via hydrogen peroxide ($H_2O_2$), hydrogen peroxide may be generated at the cathode electrode, or a hydroxyl radical ($.OH^-$) may be generated from the generated hydrogen peroxide. In addition, as oxygen molecules are transmitted through the polymer electrolyte membrane at an anode electrode of the polymer electrolyte membrane fuel cell, the hydrogen peroxide or hydroxyl radical may be generated at the anode electrode. The generated hydrogen peroxide or hydroxyl radical deteriorates a polymer including a sulfonic acid group provided in the polymer electrolyte membrane or the catalyst electrode.

Consequently, an antioxidant capable of decomposing the peroxide or radical may be included in order to inhibit the generation of radicals from the peroxide or to decompose the generated radicals, thereby preventing the deterioration of the polymer electrolyte membrane or the catalyst electrode and thus improving the chemical durability of the polymer electrolyte membrane.

The kind of the antioxidant capable of decomposing the peroxide or radical is not particularly restricted, as long as it is possible to rapidly decompose a peroxide (particularly, hydrogen peroxide) or a radical (particularly, a hydroxyl radical) generated during the operation of the polymer electrolyte membrane fuel cell.

Specifically, for example, the antioxidant capable of decomposing the peroxide or radical may be an organic-based antioxidant capable of decomposing the peroxide or radical, or a metal-based antioxidant which may be a transition metal, a noble metal capable of decomposing the peroxide or radical, an ion thereof, a salt thereof, or an oxide thereof.

Specifically, the organic-based antioxidant, i.e. the organic-based secondary antioxidant, may be one selected from the group consisting of syringic acid, vanillic acid, protocatechuic acid, coumaric acid, caffeic acid, ferulic acid, chlorogenic acid, cynarine, gallic acid, and a mixture thereof.

The organic-based antioxidant may be a compound including a resonance structure based on a carboxyl acid, a hydroxyl group, and a carbon double bond. The organic-based secondary antioxidant having this structure has a larger molecular size than an ion cluster and a channel in the polymer electrolyte membrane, whereby elution may be prevented due to the size of molecules that cannot use an elution path and through a hydrogen bond between a large amount of carboxyl acid and hydroxyl group included in the organic-based antioxidant and the polymer in the polymer electrolyte membrane.

Among the metal-based antioxidants, the transition metal capable of decomposing the peroxide or radical may be one selected from the group consisting of cerium (Ce), nickel (Ni), tungsten (W), cobalt (Co), chrome (Cr), zirconium (Zr), yttrium (Y), manganese (Mn), iron (Fe), titanium (Ti), vanadium (V), iridium (Ir), molybdenum (Mo), lanthanum (La), and neodymium (Nd).

Further, the noble metal capable of decomposing the peroxide or radical may be one selected from the group consisting of silver (Ag), platinum (Pt), ruthenium (Ru), palladium (Pd), and rhodium (Rh).

In addition, the ion of the transition metal or the noble metal capable of decomposing the peroxide or radical may be one selected from the group consisting of a cerium ion, a nickel ion, a tungsten ion, a cobalt ion, a chrome ion, a zirconium ion, an yttrium ion, a manganese ion, an iron ion, a titanium ion, a vanadium ion, iridium ion, a molybdenum ion, a lanthanum ion, a neodymium ion, a silver ion, a platinum ion, a ruthenium ion, a palladium ion, and a rhodium ion. Specifically, in the example of cerium, a cerium three-valence ion ($Ce^{3+}$) or a cerium four-valence ion ($Ce^{4+}$) may be used.

In addition, the oxide of the transition metal or the noble metal capable of decomposing the peroxide or radical may be one selected from the group consisting of cerium oxide, nickel oxide, tungsten oxide, cobalt oxide, chrome oxide, zirconium oxide, yttrium oxide, manganese oxide, iron oxide, titanium oxide, vanadium oxide, iridium oxide, molybdenum oxide, lanthanum oxide, and neodymium oxide.

In addition, the salt of the transition metal or the noble metal capable of decomposing the peroxide or radical may be one selected from the group consisting of carbonate, acetate, chloride salt, fluoride salt, sulfate, phosphate, tungstate, hydrate, ammonium acetate, ammonium sulfate, and acetylacetonate of the transition metal or the noble metal. Specifically, in the example of cerium, cerium carbonate, cerium acetate, cerium chloride, cerium acetate, cerium sulfate, ammonium cerium (II) acetate, or ammonium cerium (IV) sulfate may be used, and cerium acetylacetonate may be used as the organic metal complex salt.

In the case in which the metal-based antioxidant is dispersed in the polymer electrolyte membrane or the catalyst electrode in order to prevent the polymer electrolyte membrane from being deteriorated by radicals, however, the antioxidant capable of decomposing the peroxide or radical may be eluted during the operation of the fuel cell.

For the reasons above, the weight per unit volume of the antioxidant in the first layer and the weight per unit volume of the antioxidant in the second layer may be different from each other.

In addition, since the first ion conductor layer and the second ion conductor layer are formed respectively by the remainders of the first ion conductor and the second ion conductor forming the first layer and the second layer, the weight per unit volume of the antioxidant in the first ion conductor layer and the weight per unit volume of the antioxidant in the second ion conductor layer may also be different from each other.

Here, the unit of the weight per unit volume of the antioxidant is "$mg/cm^3$", in which the numerator "mg" indicates the weight of the antioxidant and the denominator "$cm^3$" indicates the unit volume of an randomly selected portion in the polymer electrolyte membrane.

Specifically, only one of the first layer and the second layer may include the antioxidant, or the weight per unit volume of the antioxidant in one of the first and second layers may be greater than that of the antioxidant in the other layer.

In addition, only one of the first ion conductor layer and the second ion conductor layer may include the antioxidant, or the weight per unit volume of the antioxidant in one of the first and second ion conductor layers may be greater than that of the antioxidant in the other ion conductor layer.

In addition, since each of the first ion conductor layer and the second ion conductor layer does not include the porous support while each of the first layer and the second layer includes the ion conductor and the porous support, the weight per unit volume of the antioxidant in each of the first ion conductor layer and the second ion conductor layer may be greater than that of the antioxidant in each of the first layer and the second layer.

However, the antioxidant may move between the first layer and the second layer depending on the concentration gradient thereof at the time of forming the first layer and the second layer. In an example, in the case in which the weight per unit volume of the antioxidant in the first ion conductor layer is greater than the weight per unit volume of the antioxidant in the second ion conductor layer, the antioxidant in the first layer may move to the second layer, whereby the weight per unit volume of the antioxidant in the second layer may be greater than the weight per unit volume of the antioxidant in the second ion conductor layer. That is, the weight per unit volume of the antioxidant may decreases or increases in the order of the first ion conductor layer, the first layer, the second layer, and the second ion conductor layer, so that the polymer electrolyte membrane has a concentration gradient of the antioxidant.

In this case, the weight per unit volume of the antioxidant in the layer in which the weight per unit volume of the antioxidant is larger may range from 30 $mg/cm^3$ to 4,000 $mg/cm^3$, specifically from 30 $mg/cm^3$ to 2,000 $mg/cm^3$. In addition, the weight per unit volume of the antioxidant in the layer in which the weight per unit volume of the antioxidant is smaller may range from 0 $mg/cm^3$ to 2,000 $mg/cm^3$, specifically from 10 $mg/cm^3$ to 1,000 $mg/cm^3$. If the weight per unit volume of the antioxidant in the layer in which the weight per unit volume of the antioxidant is larger is less than 30 $mg/cm^3$, oxidation stability may be reduced. If the weight per unit volume of the antioxidant in the layer in which the weight per unit volume of the antioxidant is larger is greater than 4,000 $mg/cm^3$, ion conductivity and cell performance may be reduced, and the antioxidant may be excessively discharged.

In the case in which the weight per unit volume of the antioxidant in the first layer and the weight per unit volume of the antioxidant in the second layer are different from each other, as described above, it is possible to inhibit the elution of the antioxidant during the operation of the fuel cell.

Meanwhile, in order to prevent the elution of the antioxidant during the operation of the fuel cell, one selected from the group consisting of the first layer, the second layer, and a combination thereof may include the organic-based antioxidant. Consequently, one selected from the group consisting of the first ion conductor layer, the second ion conductor layer, and a combination thereof may also include the organic-based antioxidant.

Meanwhile, any of the first layer and the second layer, in which the organic-based antioxidant is not included, may not include the antioxidant, or may include the metal-based antioxidant. Likewise, any of the first ion conductor layer and the second ion conductor layer, in which the organic-based antioxidant is not included, also may not include the antioxidant, or may include the metal-based antioxidant.

Figure 4:
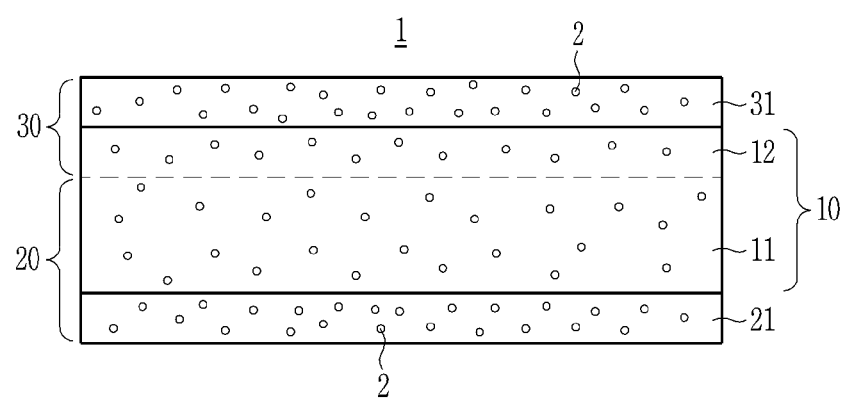
FIG. 4 is a view schematically showing the case in which a first ion conductor layer and a second ion conductor layer include organic-based antioxidants having the same weight per unit volume.
Figure 5:
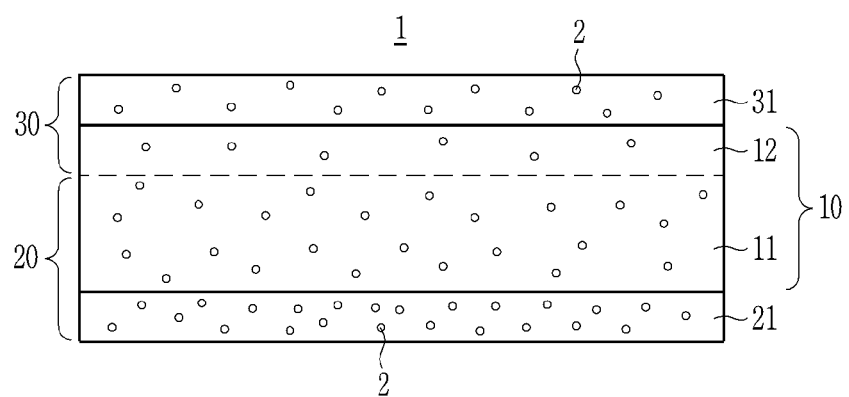
FIG. 5 is a view schematically showing the case in which the first ion conductor layer and the second ion conductor layer include organic-based antioxidants having different weights per unit volume.

FIG. 4 is a view schematically showing the case in which the first ion conductor layer and the second ion conductor layer include organic-based antioxidants of the same weights per unit volume, and FIG. 5 is a view schematically showing the case in which the first ion conductor layer and the second ion conductor layer include organic-based antioxidants of different weights per unit volume.

Referring to FIG. 4, the first ion conductor layer 21 and the second ion conductor layer 31 may include organic-based antioxidants 2 of the same weights per unit volume. Likewise, the first layer 11 and the second layer 12 may include organic-based antioxidants 2 of the same weight per unit volume. Here, the weight per unit volume of the antioxidant in each of the first ion conductor layer 21 and the second ion conductor layer 31 may be greater than the weight per unit volume of the antioxidant in each of the first layer 11 and the second layer 12.

Referring to FIG. 5, the weight per unit volume of the organic-based antioxidant 2 in the first ion conductor layer 21 may be greater than the weight per unit volume of the organic-based antioxidant 2 in the second ion conductor layer 31. Likewise, the weight per unit volume of the organic-based antioxidant 2 in the first layer 11 may be greater than the weight per unit volume of the organic-based antioxidant 2 in the second layer 12. In addition, since the organic-based antioxidant 2 in the first layer 11 may move to the second layer 12 at the time of forming the first layer 11 and the second layer 12, the weight per unit volume of the organic-based antioxidant 2 in the second layer 12 may be greater than the weight per unit volume of the organic-based antioxidant 2 in the second ion conductor layer 31. Consequently, a concentration gradient may occur in such a way that the weight per unit volume of the organic-based antioxidant 2 decreases in the order of the first ion conductor layer 21, the first layer 11, the second layer 12, and the second ion conductor layer 31.

Figure 6:
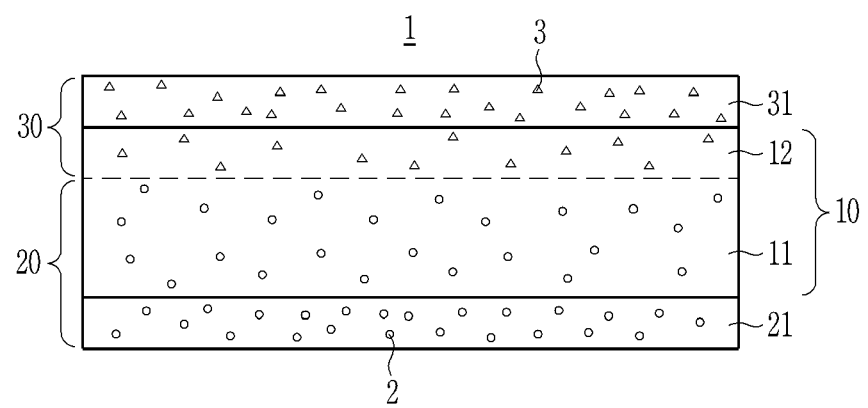
FIGS. 6 to 8 are views schematically showing the case in which the first ion conductor layer includes an organic-based antioxidant and the second ion conductor layer includes a metal-based antioxidant.
Figure 7:
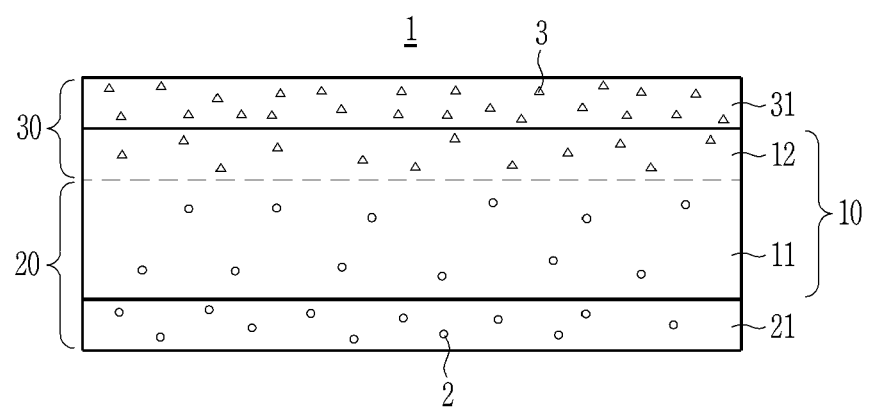
Figure 8:
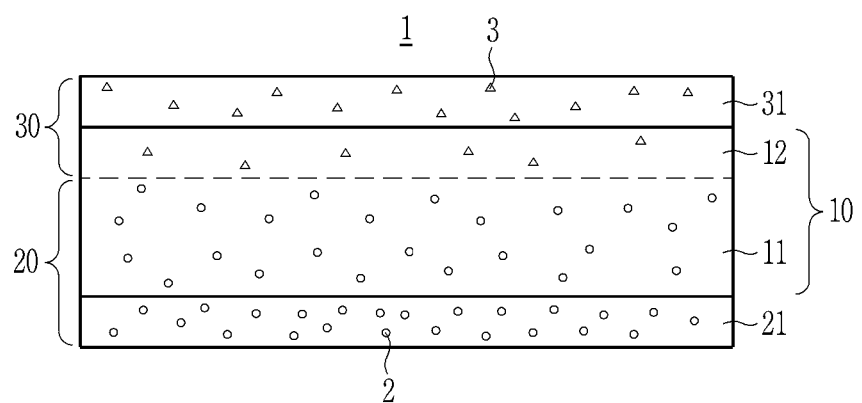

FIGS. 6 to 8 are views schematically showing the case in which the first ion conductor layer includes an organic-based antioxidant and the second ion conductor layer includes a metal-based antioxidant.

FIG. 6 shows the case in which the weight per unit volume of the organic-based antioxidant is equal to the weight per unit volume of the metal-based antioxidant, FIG. 7 shows the case in which the weight per unit volume of the organic-based antioxidant is less than the weight per unit volume of the metal-based antioxidant, and FIG. 8 shows the case in which the weight per unit volume of the organic-based antioxidant is greater than the weight per unit volume of the metal-based antioxidant.

Referring to FIG. 6, the first ion conductor layer 21 and the second ion conductor layer 31 may respectively include an organic-based antioxidant 2 and a metal-based antioxidant 3 having the same weight per unit volume. Likewise, the first layer 11 and the second layer 12 may include antioxidants having the same weight per unit volume. At this time, the weight per unit volume of the antioxidant in each of the first ion conductor layer 21 and the second ion conductor layer 31 may be greater than the weight per unit volume of the antioxidant in each of the first layer 11 and the second layer 12.

Referring to FIG. 7, the weight per unit volume of the organic-based antioxidant 2 in the first ion conductor layer 21 may be less than the weight per unit volume of the metal-based antioxidant 3 in the second ion conductor layer 31. Likewise, the weight per unit volume of the organic-based antioxidant 2 in the first layer 11 may be less than the weight per unit volume of the metal-based antioxidant 3 in the second layer 12. In addition, since the metal-based antioxidant 3 in the second layer 12 may move to the first layer 11 at the time of forming the first layer 11 and the second layer 12, the weight per unit volume of the antioxidant in the first layer 11 may be greater than the weight per unit volume of the antioxidant in the first ion conductor layer 21. Consequently, a concentration gradient may occurs in such a way that the weight per unit volume of the antioxidant decreases in the order of the second ion conductor layer 31, the second layer 12, the first layer 11, and the first ion conductor layer 21.

Referring to FIG. 8, the weight per unit volume of the organic-based antioxidant 2 in the first ion conductor layer 21 may be greater than the weight per unit volume of the metal-based antioxidant 3 in the second ion conductor layer 31. Likewise, the weight per unit volume of the organic-based antioxidant 2 in the first layer 11 may be greater than the weight per unit volume of the metal-based antioxidant 3 in the second layer 12. In addition, since the organic-based antioxidant 2 in the first layer 11 may move to the second layer 12 at the time of forming the first layer 11 and the second layer 12, the weight per unit volume of the antioxidant in the second layer 12 may be greater than the weight per unit volume of the antioxidant in the second ion conductor layer 31. Consequently, a concentration gradient may occur in such a way that the weight per unit volume of the antioxidant decreases in the order of the first ion conductor layer 21, the first layer 11, the second layer 12, and the second ion conductor layer 31.

A method of manufacturing a polymer electrolyte membrane according to another embodiment of the present disclosure comprises preparing a porous support having a plurality of pores, filling the pores adjoining one surface of the porous support with a first ion conductor to form a first layer, and filling the pores adjoining the other surface of the porous support with a second ion conductor to form a second layer.

First, the porous support having the pores, the first ion conductor, and the second ion conductor are prepared. Since the porous support, the first ion conductor, and the second ion conductor are described above, a duplicate description thereof is omitted.

The pores adjoining the one surface of the porous support are filled with the first ion conductor to form the first layer, and the pores adjoining the other surface of the porous support are filled with the second ion conductor to form the second layer. At this time, the first ion conductor layer may also be formed on the one surface of the porous support, and the second ion conductor layer may also be formed on the other surface of the porous support.

Specifically, the pores adjoining the one surface of the porous support are filled with the first ion conductor, and the first ion conductor layer is formed on the one surface of the porous support using the remainder of the first ion conductor filling the pores adjoining the one surface of the porous support, and the pores adjoining the other surface of the porous support are filled with the second ion conductor, and the second ion conductor layer is formed on the other surface of the porous support using the remainder of the second ion conductor filling the pores adjoining the other surface of the porous support.

However, the present disclosure is not limited thereto. The pores of the porous support may be filled only with the first ion conductor, the first ion conductor layer may be formed, and the second ion conductor layer may be formed on the other surface of the porous support using the second ion conductor, or vice versa.

The step of filling the pores of the porous support with the first ion conductor and the second ion conductor may be generally performed by impregnating or submerging the porous support with or into a solution including the first ion conductor or the second ion conductor. In addition, the step of filling the pores of the porous support with the first ion conductor and the second ion conductor may be performed using a method selected from the group consisting of bar coating, comma coating, slot die coating, screen printing, spray coating, doctor blade coating, laminating, and a combination thereof.

That is, the method of manufacturing the polymer electrolyte membrane may use existing processes without any modification, except for filling the porous support via the one surface and the other surface with the first ion conductor and the second ion conductor, respectively.

The porous support may be filled with the first ion conductor and the second ion conductor each of which is in the form of a solution or dispersion including the same. A commercially available ion conductor solution or dispersion may be used as the solution or dispersion including the first or second ion conductor, or the solution or dispersion including the first or second ion conductor may be prepared by dispersing the first or second ion conductor in a solvent. The dispersing the first or second ion conductor in the solvent may be performed using a conventional well-known method, and therefore a detailed description thereof is omitted.

At this time, the antioxidant may be further added to the solution or dispersion including the first or second ion conductor. In the case in which the antioxidant is added only to the solution or dispersion including the first ion conductor, the antioxidant may be included only in the first ion conductor layer or only in a portion of the porous support. In addition, the content of the antioxidant to be added to the solution or dispersion including the first or second ion conductor may be adjusted in order to adjust the weight per unit volume of the antioxidant in the first layer, the second layer, the first ion conductor layer, or the second ion conductor layer.

After some pores of the porous support are filled with the first ion conductor, the other pores of the porous support are filled with the second ion conductor without performing a process for drying the first ion conductor. As a result, the first layer and the second layer contact each other, whereby the antioxidant may move between the first layer and the second layer depending on the concentration gradient thereof. Consequently, a concentration gradient of the antioxidant may be obtained such that the weight per unit volume of the antioxidant decreases or increases in the order of the first ion conductor layer, the first layer, the second layer, and the second ion conductor layer.

A solvent selected from the group consisting of water, a hydrophilic solvent, an organic solvent, and a mixture thereof may be used as a solvent for manufacturing the solution or dispersion including the first or second ion conductor.

The hydrophilic solvent may include a saturated or unsaturated hydrocarbon in the form of straight-chain or branched-chain having a carbon number ranging from 1 to 12 as the main chain thereof and have at least one functional group selected from the group consisting of alcohol, isopropyl alcohol, ketone, aldehyde, carbonate, carboxylate, carboxylic acid, ether, and amide. Each of them may include an alicyclic or aromatic cyclic compound as at least a portion of the main chain thereof.

The organic solvent may be selected from N-methylpyrrolidone, dimethyl sulfoxide, tetrahydrofuran, and a mixture thereof.

In addition, the step of filling the pores of the porous support with the first or second ion conductor may be affected by various factors such as temperature, time, and so on. For example, the filling step may be affected by the thickness of the porous support, the concentration of the solution or dispersion including the first or second ion conductor, the kind of the solvent, etc. However, the process may be performed at the temperature equal to or higher than the freezing point of the solvent and equal to or less than 100° C. More generally, the process may be performed at a temperature ranging from the room temperature (20° C.) to 70° C. for about 5 to 30 minutes. However, the temperature must be lower than the melting point of the porous support.

Meanwhile, the method of manufacturing the polymer electrolyte membrane may further include a step of manufacturing a plurality of porous supports, each of which includes the first ion conductor and the second ion conductor, and stacking the porous supports.

The porous supports may be stacked using a laminating method, and it is possible to manufacture a polymer electrolyte membrane having high efficiency while easily adjusting the thickness ratio of the polymer electrolyte membrane required for the fuel cell by stacking the porous supports as described above.

In accordance with another aspect of the present disclosure, there are provided a membrane-electrode assembly and a fuel cell including the polymer electrolyte membrane.

Specifically, the membrane-electrode assembly includes an anode and a cathode, disposed opposite each other, and the polymer electrolyte membrane disposed between the anode and the cathode.

Figure 9:
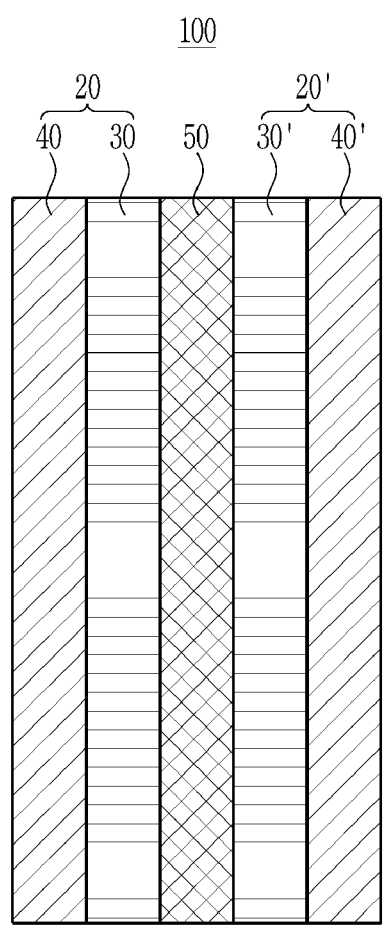
FIG. 9 is a sectional view schematically showing a membrane-electrode assembly according to an embodiment of the present disclosure.

FIG. 9 is a sectional view schematically showing a membrane-electrode assembly according to an embodiment of the present disclosure. Referring to FIG. 9, the membrane-electrode assembly 100 includes the polymer electrolyte membrane 50 and electrodes 20 and 20' for the fuel cell respectively disposed on the opposite surfaces of the polymer electrolyte membrane 50. The electrodes 20 and 20' respectively include electrode substrates 40 and 40' and catalyst layers 30 and 30' formed on the surfaces of the electrode substrates 40 and 40', and may further include microporous layers (not shown) disposed between the electrode substrates 40 and 40' and the catalyst layers 30 and 30', the microporous layers including conductive microparticles, such as carbon powder or carbon black, for easy material diffusion at the electrode substrates 40 and 40'.

In the membrane-electrode assembly 100, the electrode 20, which is disposed on one surface of the polymer electrolyte membrane 50 to perform an oxidation reaction by which protons and electrons are generated from fuel transferred to the catalyst layer 30 via the electrode substrate 40, is referred to as an anode, and the electrode 20', which is disposed on the other surface of the polymer electrolyte membrane 50 to perform a reduction reaction by which water is generated from protons supplied through the polymer electrolyte membrane 50 and an oxidant transferred to the catalyst layer 30' via the electrode substrate 40', is referred to as a cathode.

Each of the catalyst layers 30 and 30' of the anode and cathode 20 and 20' includes a catalyst. Any catalyst may be used, as long as the catalyst participates in cell reaction so as to be generally usable as a catalyst of a fuel cell. Specifically, a platinum-based metal may be used as the catalyst.

The platinum-based metal may include one selected from the group consisting of platinum (Pt), palladium (Pd), ruthenium (Ru), iridium (Ir), osmium (Os), a platinum-M alloy (M being at least one selected from the group consisting of palladium (Pd), ruthenium (Ru), iridium (Ir), osmium (Os), gallium (Ga), titanium (Ti), vanadium (V), chrome (Cr), manganese (Mn), iron (Fe), cobalt (Co), nickel (Ni), copper (Cu), silver (Ag), gold (Au), zinc (Zn), tin (Sn), molybdenum (Mo), tungsten (W), lanthanum (La), and rhodium (Rh)), a non-platinum alloy, and a combination thereof. More preferably, a combination of two or more metals selected from the platinum-based catalyst metal group is used. However, the present disclosure is not limited thereto. Any platinum-based catalyst metal that is available in the present technical field may be used without limitation.

Specifically, the platinum alloy may be selected from the group consisting of Pt—Pd, Pt—Sn, Pt—Mo, Pt—Cr, Pt—W, Pt—Ru, Pt—Ru—W, Pt—Ru—Mo, Pt—Ru—Rh—Ni, Pt—Ru—Sn—W, Pt—Co, Pt—Co—Ni, Pt—Co—Fe, Pt—Co—Ir, Pt—Co—S, Pt—Co—P, Pt—Fe, Pt—Fe—Ir, Pt—Fe—S, Pt—Fe—P, Pt—Au—Co, Pt—Au—Fe, Pt—Au—Ni, Pt—Ni, Pt—Ni—Ir, Pt—Cr, Pt—Cr—Ir, and a combination thereof, which may be used either alone or in a mixture of two or more thereof.

In addition, the non-platinum alloy may be selected from the group consisting of Ir—Fe, Ir—Ru, Ir—Os, Co—Fe, Co—Ru, Co—Os, Rh—Fe, Rh—Ru, Rh—Os, Ir—Ru—Fe, Ir—Ru—Os, Rh—Ru—Fe, Rh—Ru—Os, and a combination thereof, which may be used either alone or in a mixture of two or more thereof.

The catalyst may be used as a catalyst alone (black), or may be used in the state of being supported by a support.

The support may be selected from a carbon-based support, porous inorganic oxide such as zirconia, alumina, titania, silica, ceria, etc., and zeolite. The carbon-based support may be selected from graphite, super P, carbon fiber, carbon sheet, carbon black, Ketjen black, Denka black, acetylene black, carbon nanotube (CNT), carbon sphere, carbon ribbon, fullerene, activated carbon, carbon nanofiber, carbon nanowire, carbon nanoball, carbon nanohorn, carbon nanocage, carbon nanoring, ordered nano-/meso-porous carbon, carbon aerogel, mesoporous carbon, graphene, stabilized carbon, activated carbon, and a combination of thereof. However, the present disclosure is not limited thereto. Any support that is available in the present technical field may be used without limitation.

The catalyst particles may be located on the surface of the support, or may permeate into the support thereby filling the pores of the support.

In the case in which a noble metal supported on the support is used as the catalyst, a commercially available catalyst may be used, or the catalyst manufactured by making the noble metal supported by the support may be used. The process of making the noble metal supported by the support is well-known in the art to which the present disclosure pertains and is easily understood by those skilled in the art, and therefore a detailed description thereof is omitted in this specification.

The catalyst particles may be included so as to account for 20 wt % to 80 wt % of the overall weight of each of the catalyst electrodes 30 and 30'. If the content of the catalyst particles is less than 20 wt %, catalyst activation may be reduced. If the content of the catalyst particles is greater than 80 wt %, the activation area may be reduced due to cohesion of catalyst particles, whereby catalyst activation may be reduced.

In addition, each of the catalyst electrodes 30 and 30' may include a binder for improving the adhesive force of the catalyst electrodes 30 and 30' and transferring protons. Preferably, an ion conductor having ion conductivity is used as the binder. The ion conductor is the same as described above, and therefore a duplicate description thereof is omitted.

The ion conductor may be used either alone or in the form of a mixture. In addition, the ion conductor may optionally be used together with a non-conductive compound in order to further increase the adhesive force with respect to the polymer electrolyte membrane 50. Preferably, the amount of the ion conductor that is used is adjusted for the purpose thereof.

At least one selected from the group consisting of polytetrafluoroethylene (PTFE), a tetrafluoroethylene-hexafluoropropylene copolymer (FEP), a tetrafluoroethylene-perfluoroalkyl vinyl ether copolymer (PFA), ethylene/tetrafluoroethylene (ETFE), an ethylene chlorotrifluoroethylene copolymer (ECTFE), polyvinylidene fluoride, a polyvinylidene fluoride-hexafluoropropylene copolymer (PVdF-HFP), dodecylbenzenesulfonic acid, and sorbitol may be used as the non-conductive compound.

The binder may be included so as to account for 20 wt % to 80 wt % of the overall weight of each of the catalyst electrodes 30 and 30'. If the content of the binder is less than 20 wt %, generated ions may not be transferred successfully. If the content of the binder is greater than 80 wt %, pores are insufficient, whereby it may be difficult to supply hydrogen or oxygen (air), and an active area for reaction may be reduced.

In order to smoothly supply hydrogen or oxygen, a porous conductive substrate may be used as each of the electrode substrates 40 and 40'. In a representative example, carbon paper, carbon cloth, carbon felt, or metal cloth (a porous film made of fibrous metal cloth or a metal film formed on the surface of cloth made of polymer fiber) may be used. However, the present disclosure is not limited thereto. In addition, preferably, a fluorine-based resin that has undergone water-repellency treatment is used as each of the electrode substrates 40 and 40', since it is possible to prevent reactant diffusion efficiency from being reduced by water generated during the operation of the fuel cell. Polytetrafluoroethylene, polyvinylidene fluoride, polyhexafluoropropylene, polyperfluoroalkyl vinyl ether, polyperfluorosulfonylfluoride alkoxy vinyl ether, fluorinated ethylene propylene, polychlorotrifluoroethylene, or a copolymer thereof may be used as the fluorine-based resin.

In addition, a microporous layer for improving reactant diffusion efficiency at each of the electrode substrates 40 and 40' may be further included. The microporous layer may generally include conductive powder having a small particle diameter, such as carbon powder, carbon black, acetylene black, activated carbon, carbon fiber, fullerene, carbon nanotube, carbon nanowire, carbon nanohorn, or carbon nanoring.

The microporous layer is manufactured by coating a composition, including conductive powder, a binder resin, and a solvent, on each of the electrode substrates 40 and 40'. Polytetrafluoroethylene, polyvinylidene fluoride, polyhexafluoropropylene, polyperfluoroalkyl vinyl ether, polyperfluorosulfonylfluoride, alkoxy vinyl ether, polyvinyl alcohol, cellulose acetate, or a copolymer thereof is preferably used as the binder resin. Ethanol, alcohol, such as isopropyl alcohol, n-propyl alcohol, or butyl alcohol, water, dimethylacetamide, dimethyl sulfoxide, N-methylpyrrolidone, or tetrahydrofuran is preferably used as the solvent. The coating process may be performed using a screen printing method, a spray coating method, or a doctor-blade coating method depending on the viscosity of the composition. However, the present disclosure is not limited thereto.

The membrane-electrode assembly 100 may be manufactured according to a general method of manufacturing a membrane-electrode assembly for fuel cells, except that the polymer electrolyte membrane 50 according to the present disclosure is used as the polymer electrolyte membrane 50.

A fuel cell according to a further embodiment of the present disclosure may include the membrane-electrode assembly 100.

Figure 10:
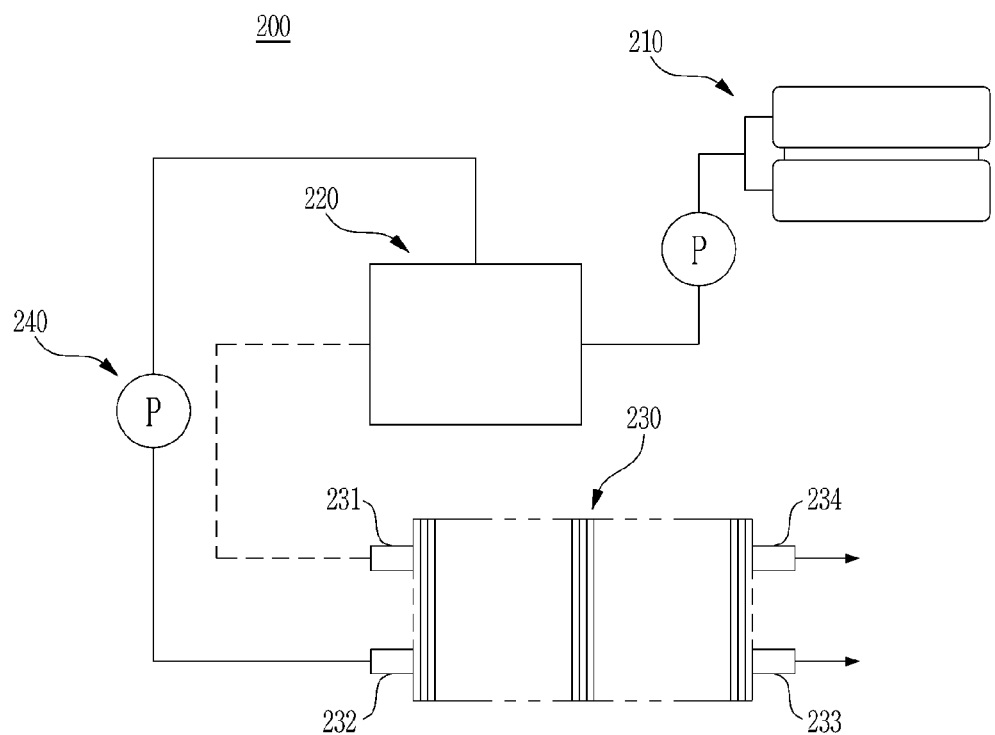
FIG. 10 is a schematic view showing the overall construction of a fuel cell according to an embodiment of the present disclosure.

FIG. 10 is a schematic view showing the overall construction of the fuel cell.

Referring to FIG. 10, the fuel cell 200 includes a fuel supply unit 210 for supplying a mixed fuel including fuel and water mixed with each other, a reforming unit 220 for reforming the mixed fuel to generate a reformed gas including hydrogen gas, a stack 230 for inducing an electrochemical reaction between the reformed gas including the hydrogen gas, supplied from the reforming unit 220, and an oxidant to generate electrical energy, and an oxidant supply unit 240 for supplying the oxidant to the reforming unit 220 and the stack 230.

The stack 230 includes a plurality of unit cells for inducing an oxidation/reduction reaction between the reformed gas including the hydrogen gas, supplied from the reforming unit 220, and the oxidant, supplied from the oxidant supply unit 240, to generate electrical energy.

Each of the unit cells, which is an independent cell capable of generating electricity, includes the membrane-electrode assembly for inducing an oxidation/reduction reaction between a reformed gas including hydrogen gas and oxygen in an oxidant, and a separator (which is also called a bipolar plate; hereinafter, referred to as a "separator") for supplying the reformed gas including the hydrogen gas and the oxidant to the membrane-electrode assembly. The separators are disposed at opposite sides of each of the membrane-electrode assemblies in the state in which the membrane-electrode assembly is located between the separators. The separators disposed at the outermost sides of the stack may be particularly referred to as end plates.

One of the end plates is provided with a first supply pipe 231 for injecting a reformed gas including hydrogen gas, supplied from the reforming unit 220, and a second supply pipe 232 for injecting oxygen gas, and the other end plate is provided with a first discharge pipe 233 for discharging the reformed gas including the remaining unreacted hydrogen gas in the unit cells to the outside and a second discharge pipe 234 for discharging the remaining unreacted oxidant in the unit cells to the outside.

The separators constituting the electricity generation unit, the fuel supply unit, and the oxidant supply unit are used in a general fuel cell, except that a membrane-electrode assembly 100 according to an embodiment of the present disclosure is used in the fuel cell, and therefore a detailed description thereof will be omitted in this specification.

MODE FOR INVENTION

Hereinafter, examples of the present disclosure will be described in detail with reference to the accompanying drawings such that the examples of the present disclosure can be easily implemented by a person having ordinary skill in the art to which the present disclosure pertains. However, the present disclosure may be realized in various different forms, and is not limited to the examples described herein.

Manufacturing Example 1: Manufacture of Ion Conductor

Manufacturing Example 1-1

1) Manufacture of Hydrophobic Repeating Unit

As represented by Reaction Formula 1 below, bisphenol A and 1,3-bis(4-fluorobenzoyol)benzene were reacted using a co-solvent of DMAc/toluene in the presence of potassium carbonate at 160 to 180° C. for 30 hours, discharged into purified water so as to be washed, and dried using hot air. At this time, a Carothers equation was used in order to adjust the degree of polymerization of an oligomer.

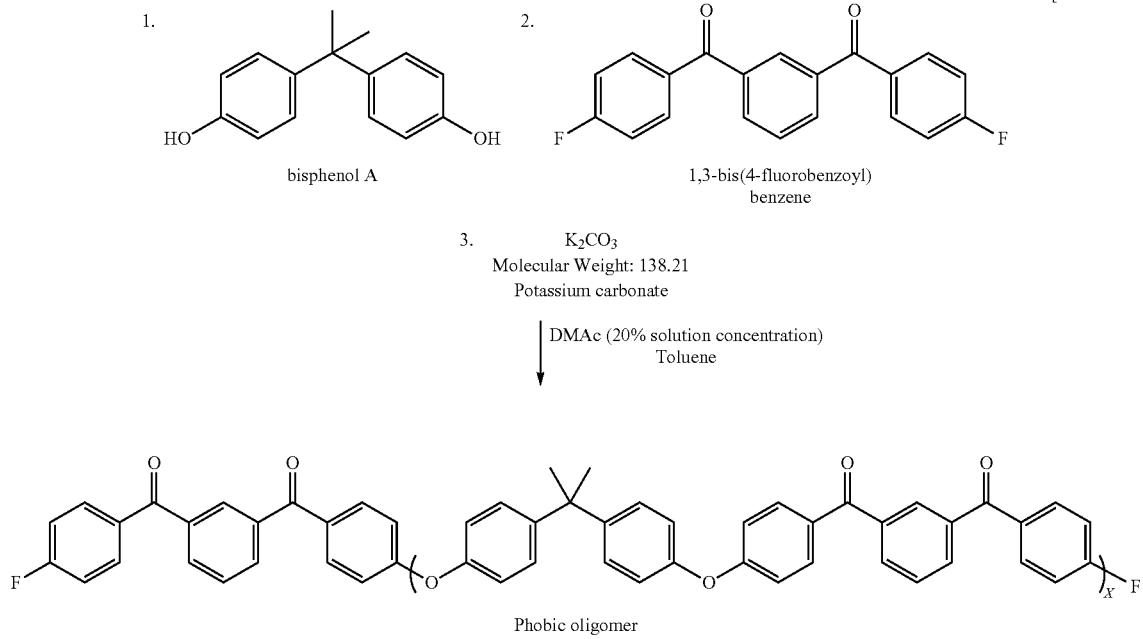

2) Manufacture of Hydrophilic Repeating Unit

As represented by Reaction Formula 24 below, 4,4'-(9-fluorenyliene)diphenol and bis(4-fluorophenyl)sulfone were reacted using a co-solvent of DMAc/toluene in the presence of potassium carbonate at 160 to 180° C. for 30 hours, discharged into purified water so as to be washed, and dried using hot air. At this time, a Carothers equation was used in order to adjust the degree of polymerization of an oligomer.

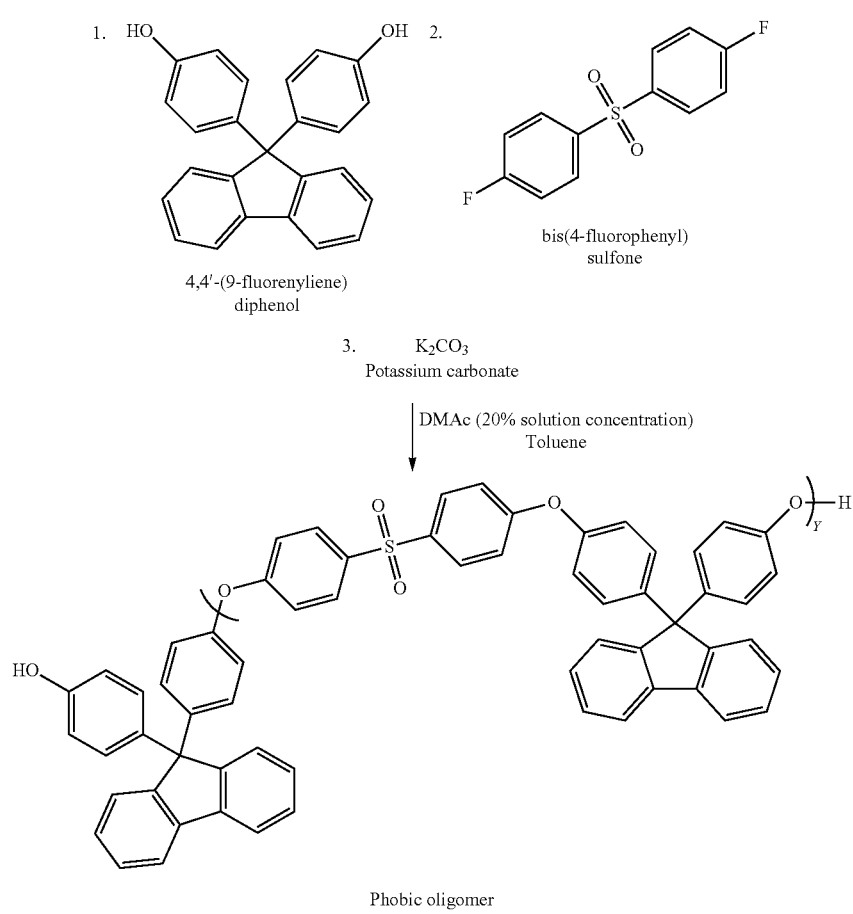

3) Manufacture of Polymer

The manufactured hydrophobic repeating unit and hydrophilic repeating unit were reacted using a co-solvent of DMAc/toluene in the presence of potassium carbonate at 160 to 180° C. for 30 hours, discharged into purified water so as to be washed, and dried using hot air. The molar ratio of the hydrophilic repeating unit to the hydrophobic repeating unit of the manufactured polymer was 1:3.5.

4) Manufacture of Ion Conductor

The manufactured polymer was dissolved in dichloromethane, slowly introduced into a chlorosulfonic acid/DCM solution, the amount of which was five times as large as the amount of the dichloromethane having the polymer dissolved therein, and stirred for 24 hours. The solution was removed, and the separated solid body was washed using purified water and then dried using hot air.

Manufacturing Example 1-2

An ion conductor was manufactured in the same manner as in Manufacturing Example 1-1, except that the polymer was manufactured such that the molar ratio of the hydrophilic repeating unit to the hydrophobic repeating unit was 1:2.5, unlike Manufacturing Example 1-1.

Manufacturing Example 1-3

1) Manufacture of Hydrophobic Repeating Unit

As represented by Reaction Formula 3—below, 4,4'-dihydroxybenzophenone and 2,6-difluorobenzonitrile were reacted using a co-solvent of DMAc/toluene in the presence of potassium carbonate at 160 to 180° C. for 30 hours, discharged into purified water so as to be washed, and dried using hot air. At this time, a Carothers equation was used in order to adjust the degree of polymerization of an oligomer.

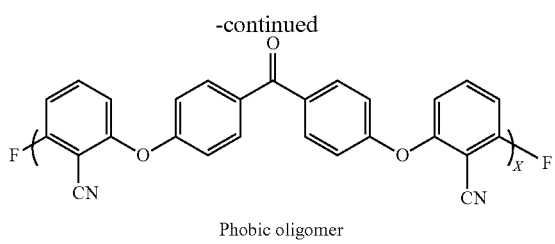

Phobic oligomer

2) Manufacture of Hydrophilic Repeating Unit

As represented by Reaction Formula 4 below, 4,4'-(9-fluorenyliene)diphenol and bis(4-fluorophenyl)sulfone were reacted using a co-solvent of DMAc/toluene in the presence of potassium carbonate at 160 to 180° C. for 30 hours, discharged into purified water so as to be washed, and dried using hot air. At this time, a Carothers equation was used in order to adjust the degree of polymerization of an oligomer.

of the hydrophilic repeating unit (Y) to the hydrophobic repeating unit (X) of the manufactured polymer was 1:3.5.

4) Manufacture of Ion Conductor

The manufactured polymer was dissolved in dichloromethane, slowly introduced into a chlorosulfonic acid/DCM solution, the amount of which was five times as large as the amount of the dichloromethane having the polymer dissolved therein, and stirred for 24 hours. The solution was removed, and the separated solid body was washed using purified water and then dried using hot air.

Manufacturing Example 1-4

An ion conductor was manufactured in the same manner as in Manufacturing Example 1-3, except that the polymer was manufactured such that the molar ratio of the hydrophilic repeating unit to the hydrophobic repeating unit was 1:2.5, unlike Manufacturing Example 1-3.

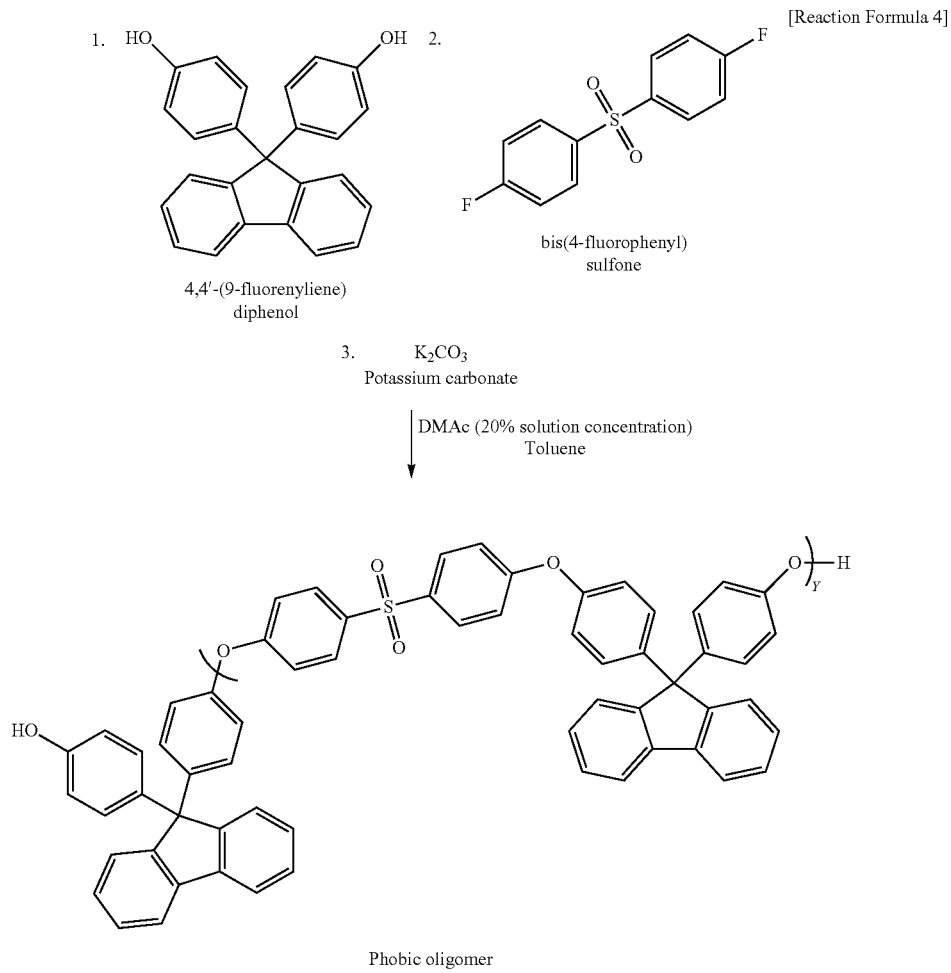

[Reaction Formula 4]

3) Manufacture of Polymer

The manufactured hydrophobic repeating unit and hydrophilic repeating unit were reacted using a co-solvent of DMAc/toluene in the presence of potassium carbonate at 160 to 180° C. for 30 hours, discharged into purified water so as to be washed, and dried using hot air. The molar ratio Manufacturing Example 1-5

1) Manufacture of Hydrophobic Repeating Unit 4,4'-dihydroxybenzophenone and bis(4-fluorophenyl)sulfone were reacted using a co-solvent of DMAc/toluene in the presence of potassium carbonate at 160 to 180° C. for 30 hours, discharged into purified water so as to be washed, and dried using hot air. At this time, a Carothers equation was used in order to adjust the degree of polymerization of an oligomer.

2) Manufacture of Hydrophilic Repeating Unit 4,4'-(9-fluorenyliene)diphenol and 1,3-bis(4-fluorobenzoyol)benzene were reacted using a co-solvent of DMAc/toluene in the presence of potassium carbonate at 160 to 180° C. for 30 hours, discharged into purified water so as to be washed, and dried using hot air. At this time, a Carothers equation was used in order to adjust the degree of polymerization of an oligomer.

3) Manufacture of Polymer

The manufactured hydrophobic repeating unit and hydrophilic repeating unit were reacted using a co-solvent of DMAc/toluene in the presence of potassium carbonate at 160 to 180° C. for 30 hours, discharged into purified water so as to be washed, and dried using hot air to manufacture a polymer represented by Chemical Formula 7 below. The molar ratio of the hydrophilic repeating unit (X) to the hydrophobic repeating unit (Y) of the manufactured polymer was 1:3.5.

The weight per unit area of the polyimide nanofiber in the porous support was 6.8 gsm.

Example 1: Manufacture of Polymer Electrolyte Membrane

Example 1-1

The ion conductor manufactured according to Manufacturing Example 1-1, the molar ratio of the hydrophilic repeating unit to the hydrophobic repeating unit of which was 1:3.5, as a second ion conductor, and the ion conductor manufactured according to Manufacturing Example 1-2, the molar ratio of the hydrophilic repeating unit to the hydrophobic repeating unit of which was 1:2.5, as a first ion conductor, were each dissolved in DMAc so as to account for 20 wt % to manufacture ion conductor solutions.

At this time, ferulic acid was added to each of the ion conductor solutions so as to account for 0.5 wt % based on 100 wt % of the ion conductor.

Subsequently, one surface and the other surface of the porous support manufactured according to Manufacturing

[Chemical Formula 7]

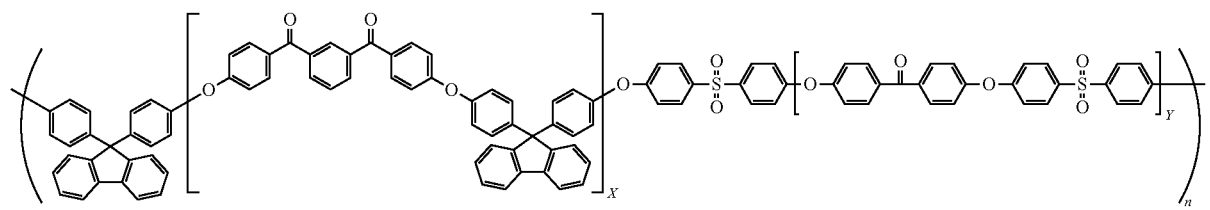

4) Manufacture of Ion Conductor

The manufactured polymer was dissolved in dichloromethane, slowly introduced into a chlorosulfonic acid/DCM solution, the amount of which was five times as large as the amount of the dichloromethane having the polymer dissolved therein, and stirred for 24 hours. The solution was removed, and the separated solid body was washed using purified water and then dried using hot air.

Manufacturing Example 1-6

An ion conductor was manufactured in the same manner as in Manufacturing Example 1-5, except that the polymer was manufactured such that the molar ratio of the hydrophilic repeating unit to the hydrophobic repeating unit was 1:2.5, unlike Manufacturing Example 1-5.

Manufacturing Example 2: Manufacture of Porous Support

Manufacturing Example 2-1

Polyamic acid was dissolved in dimethylformamide to manufacture 5 L of a spinning solution having viscosity of 480 poises. The manufactured spinning solution was fed to a solution tank and was then supplied to a spinning chamber, which included 20 nozzles and to which a high voltage of 3 kV was applied, through a quantitative gear pump, and spinning was carried out to manufacture a nanofiber precursor web. At this time, the amount of the solution that was supplied was 1.5 ml/min. The manufactured nanofiber precursor web was thermally treated at 350° C. to manufacture a porous support (porosity: 40 volume %).

Example 2-1 were impregnated with the second ion conductor solution and the first ion conductor solution, respectively, to manufacture a polymer electrolyte membrane.

Specifically, the impregnation method was performed as follows. First, one surface of the porous support was impregnated with the ion conductor manufactured according to Manufacturing Example 1-2, the molar percentage of the hydrophilic repeating unit of which was relatively high, such that pores adjoining one surface of the porous support were filled with the ion conductor to form a first layer, and then a first ion conductor layer was formed on one surface of the porous support. In addition, the other surface of the porous support was impregnated with the ion conductor manufactured according to Manufacturing Example 1-1, the molar percentage of the hydrophobic repeating unit of which was relatively high, such that pores adjoining the other surface of the porous support were filled with the ion conductor to form a second layer, and then a second ion conductor layer was formed on the other surface of the porous support.

After each surface of the porous support was impregnated for 30 minutes, the porous support was subjected to decompression for 1 hour, and was dried in a vacuum of 80° C. for 10 hours to manufacture a polymer electrolyte membrane.

At this time, the weight of the ion conductor was 65 mg/cm². In addition, the ratio of the thickness of the first ion conductor manufactured according to Manufacturing Example 1-2, the molar percentage of the hydrophilic repeating unit of which was relatively high, to the overall thickness of the manufactured polymer electrolyte membrane was 70%, and the ratio of the thickness of the second ion conductor manufactured according to Manufacturing Example 1-1, the molar percentage of the hydrophobic repeating unit of which was relatively high, to the overall thickness of the manufactured polymer electrolyte membrane was 30%. Here, the thickness ratio is measured based on the sum of the thickness of the ion conductors impregnated in the porous support and the thickness of the ion conductor layers formed on the surfaces of the porous support.

The weight per unit volume of the antioxidant in the manufactured first ion conductor layer was 300 mg/cm$^3$, the weight per unit volume of the antioxidant in the first layer was 210 mg/cm$^3$, the weight per unit volume of the antioxidant in the second layer was 210 mg/cm$^3$, and the weight per unit volume of the antioxidant in the second ion conductor layer was 300 mg/cm$^3$.

Example 1-2 and Example 1-3

Polymer electrolyte membranes were manufactured in the same manner as in Example 1-1, except that the ion conductors manufactured according to Manufacturing Example 1-3 and Manufacturing Example 1-4 and the ion conductors manufactured according to Manufacturing Example 1-5 and Manufacturing Example 1-6 were used instead of the ion conductors manufactured according to Manufacturing Example 1-1 and Manufacturing Example 1-2, unlike Example 1-1.

Example 1-4

A polymer electrolyte membrane was manufactured in the same manner as in Example 1-1, except that the ion conductor solution including the ion conductor manufactured according to Manufacturing Example 1-1 included no antioxidant and that the ion conductor solution including the ion conductor manufactured according to Manufacturing Example 1-2 included ferulic acid so as to account for 0.5 wt % based on 100 wt % of the ion conductor, unlike Example 1-1.

The weight per unit volume of the antioxidant in the manufactured first ion conductor layer was 300 mg/cm$^3$, the weight per unit volume of the antioxidant in the first layer was 220 mg/cm$^3$, the weight per unit volume of the antioxidant in the second layer was 180 mg/cm$^3$, and the weight per unit volume of the antioxidant in the second ion conductor layer was 100 mg/cm$^3$.

Example 1-5

A polymer electrolyte membrane was manufactured in the same manner as in Example 1-1, except that the ion conductor solution including the ion conductor manufactured according to Manufacturing Example 1-1 included ferulic acid so as to account for 0.5 wt % based on 100 wt % of the ion conductor and that the ion conductor solution including the ion conductor manufactured according to Manufacturing Example 1-2 included no antioxidant, unlike Example 1-1.

The weight per unit volume of the antioxidant in the manufactured first ion conductor layer was 100 mg/cm$^3$, the weight per unit volume of the antioxidant in the first layer was 180 mg/cm$^3$, the weight per unit volume of the antioxidant in the second layer was 210 mg/cm$^3$, and the weight per unit volume of the antioxidant in the second ion conductor layer was 300 mg/cm$^3$.

Example 1-6

A polymer electrolyte membrane was manufactured in the same manner as in Example 1-1, except that the ion conductor solution including the ion conductor manufactured according to Manufacturing Example 1-1 included ferulic acid so as to account for 0.5 wt % based on 100 wt % of the ion conductor and that cerium nitrate, as an antioxidant, was added to the ion conductor solution including the ion conductor manufactured according to Manufacturing Example 1-2 so as to account for 0.5 wt % based on 100 wt % of the ion conductor, unlike Example 1-1.

The weight per unit volume of the antioxidant in the manufactured first ion conductor layer was 300 mg/cm$^3$, the weight per unit volume of the antioxidant in the first layer was 210 mg/cm$^3$, the weight per unit volume of the antioxidant in the second layer was 210 mg/cm$^3$, and the weight per unit volume of the antioxidant in the second ion conductor layer was 300 mg/cm$^3$.

Comparative Example 1-1

The porous support manufactured according to Manufacturing Example 2-1 was impregnated with an ion conductor solution, manufactured by dissolving the ion conductor manufactured according to Manufacturing Example 1-1 in DMAc so as to account for 20 wt %, twice for 30 minutes, subjected to decompression for 1 hour, and dried in a vacuum of 80° C. for 10 hours to manufacture a polymer electrolyte membrane. At this time, the weight of the ion conductor was 65 mg/cm$^2$.

At this time, cerium nitrate, as an antioxidant, was added to the ion conductor solution so as to account for 0.1 wt % based on 100 wt % of the ion conductor.

Comparative Example 1-2

The porous support manufactured according to Manufacturing Example 2-1 was impregnated with an ion conductor solution, manufactured by dissolving the ion conductor manufactured according to Manufacturing Example 1-2 in DMAc so as to account for 20 wt %, twice for 30 minutes, subjected to decompression for 1 hour, and dried in a vacuum of 80° C. for 10 hours to manufacture a polymer electrolyte membrane. At this time, the weight of the ion conductor was 65 mg/cm$^2$.

At this time, cerium nitrate, as an antioxidant, was added to the ion conductor solution so as to account for 0.1 wt % based on 100 wt % of the ion conductor.

Comparative Example 1-3

A polymer electrolyte membrane was manufactured in the same manner as in Example 1-1, except that cerium nitrate, as an antioxidant, was added both to the ion conductor solution including the ion conductor manufactured according to Manufacturing Example 1-1 and to the ion conductor solution including the ion conductor manufactured according to Manufacturing Example 1-2 so as to account for 0.5 wt % based on 100 wt % of the ion conductor, unlike Example 1-1.

The weight per unit volume of the antioxidant in the manufactured first ion conductor layer was 300 mg/cm$^3$, the weight per unit volume of the antioxidant in the first layer was 210 mg/cm$^3$, the weight per unit volume of the antioxidant in the second layer was 210 mg/cm$^3$, and the weight per unit volume of the antioxidant in the second ion conductor layer was 300 mg/cm$^3$.

Experimental Example 1: Measurement of Characteristics of Manufactured Ion Conductors The ion exchange capacity (IEC) of each of the polymer electrolyte membranes manufactured according to Comparative Example 1-1 and Comparative Example 1-2 was evaluated through neutralization titration. In addition, the ion conductivity and dimensional stability of each of the polymer electrolyte membranes were measured under conditions of 80° C. and a relative humidity of 95% and conditions of 80° C. and a relative humidity of 50%. The results are shown in Table 1 below.

The ion conductivity was calculated by measuring the resistance of the membrane in 1M of $H_2SO_4$.

The membrane resistance was calculated using Mathematical Expression 3 below. At this time, the effective area of the membrane was 0.75 cm².

Membrane resistance $(R)=(R^1-R^2)\times$ effective area of membrane   [Mathematical Expression 3]

Where $R_1$ is resistance [Ω] when the membrane is introduced, and $R_2$ is resistance [Ω] when the membrane is not introduced.

The ion conductivity was calculated using Mathematical Expression 4 below.

Ion conductivity (S/cm)=$1/R \times t$   [Mathematical Expression 4]

Where R is membrane resistance [Ω·cm²], and t is the thickness of the membrane [cm].

The dimensional stability was measured as follows. The manufactured polymer electrolyte membrane was soaked in distilled water at 80° C. for 24 hours and was drawn out of the distilled water, and then the thickness and the area of the wet polymer electrolyte membrane were measured. In addition, the polymer electrolyte membrane was dried in a vacuum at 80° C. for 24 hours, and then the thickness and the area of the dried polymer electrolyte membrane were measured. Subsequently, the thickness $T_{wet}$ and the area $L_{wet}$ of the wet polymer electrolyte membrane and the thickness $T_{dry}$ and the area $L_{dry}$ of the dried polymer electrolyte membrane were substituted into Mathematical Expressions 5 and 6 below in order to measure the thickness swelling ratio and the area swelling ratio.

$(T_{wet}-T_{dry}/T_{dry})\times 100=\Delta T$ (thickness swelling ratio, %)   [Mathematical Expression 5]

$(L_{wet}-L_{dry}/L_{dry})\times 100=\Delta L$ (area swelling ratio, %)   [Mathematical Expression 6]

ture of the hydrophilic repeating unit and the hydrophobic repeating unit. As to the characteristics of the ion conductor based on the control of the molar ratio of the hydrophilic repeating unit to the hydrophobic repeating unit, it can be seen that an ion conductor having a molar ratio of 1:2.5, i.e. having a relatively high molar percentage of the hydrophilic repeating unit, exhibits higher ion exchange capability or ion conductivity performance than an ion conductor having a molar ratio of 1:3.5, i.e. having a relatively high molar percentage of the hydrophobic repeating unit. However, it can be seen that an ion conductor having a relatively high molar percentage of the hydrophobic repeating unit is advantageous in terms of moisture content and exhibits higher dimensional stability and shape stability even for the same membrane thickness.

In particular, swelling of the polymer electrolyte membrane is a factor that greatly affects the durability of the polymer electrolyte membrane. As the shape stability of the polymer electrolyte membrane is improved, the durability of the polymer electrolyte membrane in the fuel cell may be improved, whereby the durability of the fuel cell may be improved.

Experimental Example 2: Analysis in Shape of Manufactured Polymer Electrolyte Membrane AFM images of one surface and the other surface of the polymer electrolyte membrane manufactured according to Example 1-1 are shown in FIGS. 11 and 12, respectively.

Figure 11:
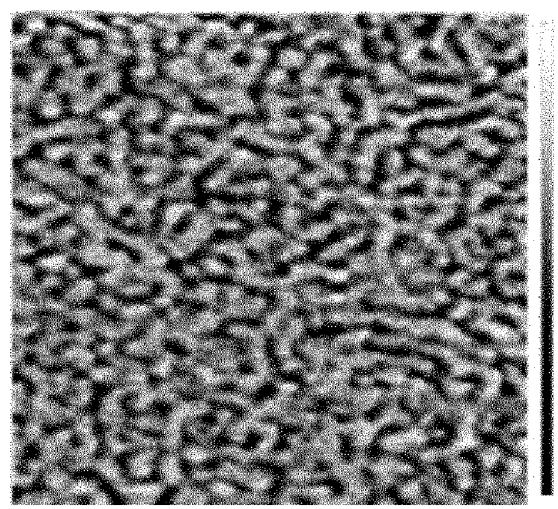
FIGS. 11 and 12 are, respectively, AFM images of one surface and the other surface of a polymer electrolyte membrane manufactured according to Example 1-1 of the present disclosure.
Figure 12:
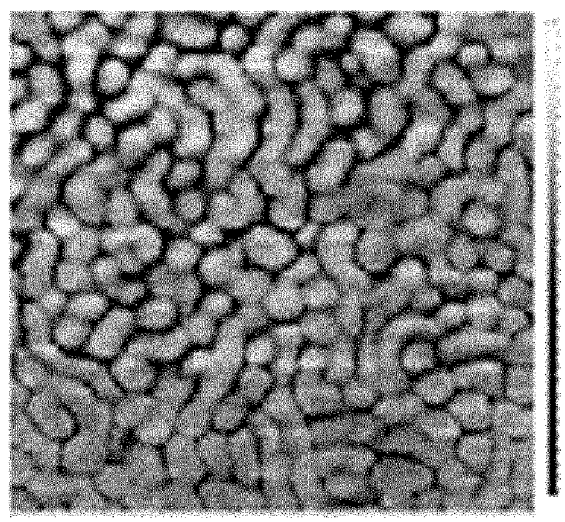

Specifically, FIG. 11 is an AFM image of one surface of a polymer electrolyte membrane impregnated with the ion conductor manufactured according to Manufacturing Example 1-1, the molar ratio of the hydrophilic repeating unit to the hydrophobic repeating unit of which was 1:3.5, i.e. the molar percentage of the hydrophobic repeating unit of which is relatively high, and FIG. 12 is an AFM image of one surface of a polymer electrolyte membrane impregnated with the ion conductor manufactured according to Manufacturing Example 1-2, the molar ratio of the hydrophilic repeating unit to the hydrophobic repeating unit of which was 1:2.5, i.e. the molar percentage of the hydrophilic repeating unit of which is relatively high.

TABLE 1

| | Molar ratio of hydrophilic repeating unit to hydrophobic repeating unit | Membrane thickness (μm) | IEC | Weight average molecular weight (Mw) | Moisture content (%) | Conductivity (S/cm) | | Dimensional stability (%) | |
|---|---|---|---|---|---|---|---|---|---|
| | | | | | | RH95 % | RH50 % | ΔL | ΔT |
| Comparative Example 1-1 | 1:3.5 | 22 to 23 | 1.65 | 150,000 | 26 | 0.14 | 0.018 | 3.9 | 16 |
| Comparative Example 1-2 | 1:2.5 | 22 to 23 | 1.8 | 160,000 | 30 | 0.17 | 0.019 | 3.9 | 20 |

As can be seen from Table 1 above, each of the polymer electrolyte membranes manufactured according to Comparative Example 1-1 and Comparative Example 1-2 includes an ion conductor including a hydrocarbon-based block copolymer constituted by a hydrophilic repeating unit and a hydrophobic repeating unit, whereby the structure of the block copolymer is easily changeable, and the characteristics of the block copolymer and the ion conductor are capable of being easily controlled by controlling the struc- Referring to FIGS. 11 and 12, it can be seen that it is possible to observe the morphology of ion conductors having different molar ratios of the hydrophilic repeating unit to the hydrophobic repeating unit and that it is possible to control the structure of the ion conductor by controlling the molar ratio of the hydrophilic repeating unit to the hydrophobic repeating unit of the ion conductor.

Specifically, when comparing an ion conduction channel formed in an ion conductor having a molar ratio of the hydrophilic repeating unit to the hydrophobic repeating unit of 1:3.5, i.e. having a relatively high molar percentage of the hydrophobic repeating unit, with an ion conduction channel formed in an ion conductor having a molar ratio of the hydrophilic repeating unit to the hydrophobic repeating unit of 1:2.5, i.e. having a relatively high molar percentage of the hydrophilic repeating unit, it can be seen that the size of the ion conduction channel formed in the ion conductor having the relatively high molar percentage of the hydrophobic repeating unit is relatively small. That is, it can be seen that, in the case of the ion conductor having the relatively high molar percentage of the hydrophobic repeating unit, the size of a hydrophilic channel formed due to phase separation of the hydrophilic repeating unit is smaller. Consequently, it can be seen that swelling of the polymer electrolyte membrane is reduced, whereby the shape stability and durability of the polymer electrolyte membrane are secured.

Example 2: Manufacture of Polymer Electrolyte Membrane

Example 2-1

Ferulic acid was added to an ion conductor solution including 30 wt % of a highly fluorinated polymer (Dyneon from 3M Company) having an equivalent weight (EW) of 725 and having a side-chain length defined by a=0 and b=4 in Chemical Formula 1 above, as a first ion conductor, so as to account for 0.5 wt % based on 100 wt % of the ion conductor to manufacture a first ion conductor solution.

In addition, ferulic acid was added to an ion conductor solution including 30 wt % of a highly fluorinated polymer (Dyneon from 3M Company) having an equivalent weight (EW) of 800 and having a side-chain length defined by a=0 and b=4 in Chemical Formula 1 above, as a second ion conductor, so as to account for 0.5 wt % based on 100 wt % of the ion conductor to manufacture a second ion conductor solution.

Subsequently, one surface and the other surface of a PTFE porous support were impregnated with the ion conductor solutions to manufacture a polymer electrolyte membrane.

Specifically, the impregnation method was performed as follows. First, one surface of the porous support was impregnated with the first ion conductor solution such that pores adjoining one surface of the porous support were filled with the first ion conductor solution to form a first layer, and then a first ion conductor layer was formed on one surface of the porous support. In addition, the other surface of the porous support was impregnated with the second ion conductor solution such that pores adjoining the other surface of the porous support were filled with the second ion conductor solution to form a second layer, and then a second ion conductor layer was formed on the other surface of the porous support.

After each surface of the porous support was impregnated for 30 minutes, the porous support was subjected to decompression for 1 hour and dried in a vacuum at 80° C. for 10 hours to manufacture a polymer electrolyte membrane.

At this time, the ratio of the thickness of the first ion conductor to the overall thickness of the manufactured polymer electrolyte membrane was 70%, and the ratio of the thickness of the second ion conductor to the overall thickness of the manufactured polymer electrolyte membrane was 30%. Here, the thickness of the ion conductor is the sum of the thickness of the ion conductor impregnated in the porous support and the thickness of the ion conductor layer formed on each surface of the porous support.

The weight per unit volume of the antioxidant in the manufactured first ion conductor layer was 300 mg/cm$^3$, the weight per unit volume of the antioxidant in the first layer was 210 mg/cm$^3$, the weight per unit volume of the antioxidant in the second layer was 210 mg/cm$^3$, and the weight per unit volume of the antioxidant in the second ion conductor layer was 300 mg/cm$^3$.

Example 2-2

A polymer electrolyte membrane was manufactured in the same manner as in Example 2-1, except that the first ion conductor solution included ferulic acid so as to account for 0.5 wt % based on 100 wt % of the ion conductor and that the second ion conductor solution included no antioxidant, unlike Example 2-1.

The weight per unit volume of the antioxidant in the manufactured first ion conductor layer was 300 mg/cm$^3$, the weight per unit volume of the antioxidant in the first layer was 220 mg/cm$^3$, the weight per unit volume of the antioxidant in the second layer was 180 mg/cm$^3$, and the weight per unit volume of the antioxidant in the second ion conductor layer was 100 mg/cm$^3$.

Example 2-3

A polymer electrolyte membrane was manufactured in the same manner as in Example 2-1, except that the first ion conductor solution included no antioxidant and that the second ion conductor solution included ferulic acid so as to account for 0.5 wt % based on 100 wt % of the ion conductor, unlike Example 2-1.

The weight per unit volume of the antioxidant in the manufactured first ion conductor layer was 100 mg/cm$^3$, the weight per unit volume of the antioxidant in the first layer was 180 mg/cm$^3$, the weight per unit volume of the antioxidant in the second layer was 220 mg/cm$^3$, and the weight per unit volume of the antioxidant in the second ion conductor layer was 300 mg/cm$^3$.

Example 2-4

A polymer electrolyte membrane was manufactured in the same manner as in Example 2-1, except that, instead of ferulic acid, cerium nitrate, as the antioxidant, was included so as to account for 0.5 wt % based on 100 wt % of the ion conductor in order to manufacture the second ion conductor solution, unlike Example 2-1.

The weight per unit volume of the antioxidant in the manufactured first ion conductor layer was 300 mg/cm$^3$, the weight per unit volume of the antioxidant in the first layer was 210 mg/cm$^3$, the weight per unit volume of the antioxidant in the second layer was 210 mg/cm$^3$, and the weight per unit volume of the antioxidant in the second ion conductor layer was 300 mg/cm$^3$.

Comparative Example 2-1

Cerium nitrate, as an antioxidant, was added to an ion conductor solution (Nafion solution product from Chemours Company) including 5 wt % of a highly fluorinated polymer having an equivalent weight (EW) of 1100 and having a side-chain length defined by a=1 and b=2 in Chemical Formula 1 above so as to account for 0.1 wt % based on 100 wt % of the ion conductor to manufacture an ion conductor solution.

Subsequently, a PTFE porous support was impregnated with the ion conductor solution to manufacture a polymer electrolyte membrane.

Comparative Example 2-2

A polymer electrolyte membrane was manufactured in the same manner as in Example 2-1, except that, instead of ferulic acid, cerium nitrate, as the antioxidant, was included so as to account for 0.5 wt % based on 100 wt % of the ion conductor in order to manufacture the first ion conductor solution and the second ion conductor solution, unlike Example 2-1.

The weight per unit volume of the antioxidant in the manufactured first ion conductor layer was 300 mg/cm$^3$, the weight per unit volume of the antioxidant in the first layer was 210 mg/cm$^3$, the weight per unit volume of the antioxidant in the second layer was 210 mg/cm$^3$, and the weight per unit volume of the antioxidant in the second ion conductor layer was 300 mg/cm$^3$.

Experimental Example 3: Analysis in Performance of Manufactured Polymer Electrolyte Membranes The performance and open-circuit voltage (OCV) retention rate of unit cells including the polymer electrolyte membranes manufactured according to the examples and the comparative examples were measured, and the results are shown in Table 2 and Table 3 below.

The electrochemical performance of the unit cells including the polymer electrolyte membranes was measured using the apparatus described below.

As the apparatus for measuring the energy efficiency, unit cells each having an electrode area of cm$^2$, configured such that microporous layers were formed on opposite surfaces of each of the unit cells, were prepared in order to measure the performance of unit cells constituting a fuel cell. Hydrogen and oxygen that had passed through a humidifier were supplied to opposite electrodes in order to operate the fuel cell. The performance of the unit cells was measured under conditions of 65° C. and a relative humidity of 100%, and the current density values of the unit cells at 0.6 V were compared with each other. The open-circuit voltage retention rate of the unit cells was measured by operating the fuel cell at an open-circuit voltage under conditions of 90° C. and a relative humidity of 30%, and was evaluated based on the difference between an initial open-circuit voltage and an open-circuit voltage after the operation of the fuel cell for 500 hours.

TABLE 2

| | Molar ratio of hydrophilic repeating unit to hydrophobic repeating unit | Membrane thickness (μm) | Cell performance (mA/cm$^2$) | OCV variation (%) |
|---|---|---|---|---|
| Comparative Example 1-1 | 1:3.5 | 22 to 23 | 1045 | 95 |
| Comparative Example 1-2 | 1:2.5 | 22 to 23 | 1027 | 97 |
| Comparative Example 1-3 | 1:2.5 + 1:3.5 [1] | 22 to 23 | 1013 | 97 |
| Example 1-1 | 1:2.5 + 1:3.5 [1] | 22 to 23 | 1098 | 97 |
| Example 1-4 | 1:2.5 + 1:3.5 [1] | 22 to 23 | 1127 | 96 |

TABLE 2-continued

| | Molar ratio of hydrophilic repeating unit to hydrophobic repeating unit | Membrane thickness (μm) | Cell performance (mA/cm$^2$) | OCV variation (%) |
|---|---|---|---|---|
| Example 1-5 | 1:2.5 + 1:3.5 [1] | 22 to 23 | 1124 | 97 |
| Example 1-6 | 1:2.5 + 1:3.5 [1] | 22 to 23 | 1216 | 98 |
| Nafion 211 Commercial membrane | — | 25 | 1184 | 89 |

1) The thickness ratio of the first ion conductor manufactured according to Manufacturing Example 1-2, the molar percentage of the hydrophilic repeating unit of which is relatively high, to the second ion conductor manufactured according to Manufacturing Example 1-1, the molar percentage of the hydrophobic repeating unit of which is relatively high, is 7:3. Here, the thickness ratio is measured based on the sum of the thickness of the ion conductors impregnated in the porous support and the thickness of the ion conductor layers formed on the surfaces of the porous support.

TABLE 3

| | Equivalent weight | Membrane thickness (μm) | Cell performance (mA/cm$^2$) | OCV variation (%) |
|---|---|---|---|---|
| Example 2-1 | 725 + 800 | 20 to 23 | 1248 | 96 |
| Example 2-2 | 725 + 800 | 20 to 23 | 1342 | 95 |
| Example 2-3 | 725 + 800 | 20 to 23 | 1339 | 96 |
| Example 2-4 | 725 + 800 | 20 to 23 | 1267 | 97 |
| Comparative Example 2-1 | 1100 | 20 to 23 | 1140 | 90 |
| Comparative Example 2-2 | 725 + 800 | 20 to 23 | 1214 | 93 |

Referring to Table 2 and Table 3 above, it can be seen that the performance of the cells including the polymer electrolyte membranes manufactured according to Example 1-1 and Comparative Example 1-3 is based on the performance of an ion conductor having a relatively high molar percentage of the hydrophilic repeating unit and a relatively high ion conductivity, that the open-circuit voltage retention rate of the cells is based on the performance of an ion conductor having a relatively high molar percentage of the hydrophobic repeating unit and a relatively high durability, and that overall system efficiency is higher than in the case of the polymer electrolyte membranes manufactured according to Comparative Example 1-1 and Comparative Example 1-2. In addition, it can be seen that, in the case of the polymer electrolyte membranes manufactured according to Example 1-4, Example 1-5, and Example 1-6, the porous support, the first ion conductor layer, and the second ion conductor layer include antioxidants in different amounts or organic-based antioxidants, whereby the elution of the antioxidants is inhibited during the operation of the fuel cell and thus efficiency is further improved.

However, it can be seen that, in the case of the polymer electrolyte membrane manufactured according to Comparative Example 1-3, the porous support, the first ion conductor layer, and the second ion conductor layer include antioxidants having the same content and no organic-based antioxidants, whereby the antioxidants are eluted during the operation of the fuel cell and thus efficiency is deteriorated.

In the same manner, it can be seen that, in the case of the polymer electrolyte membranes manufactured according to Example 2-1 and Comparative Example 2-2, the first ion conductor layer and the second ion conductor layer include highly fluorinated polymers having different side-chain lengths, whereby overall system efficiency is higher than the case of the polymer electrolyte membrane manufactured according to Comparative Example 2-1.

In addition, it can be seen that, in the case of the polymer electrolyte membranes manufactured according to Example 2-2 to Example 2-4, the porous support, the first ion conductor layer, and the second ion conductor layer include antioxidants in different amounts or organic-based antioxidants, whereby elution of the antioxidants is inhibited during the operation of the fuel cell and thus efficiency is further improved.

However, it can be seen that, in the case of the polymer electrolyte membrane manufactured according to Comparative Example 2-2, the porous support, the first ion conductor layer, and the second ion conductor layer include antioxidants having the same content and no organic-based antioxidants, whereby the antioxidants are eluted during the operation of the fuel cell and thus efficiency is deteriorated.

Although the preferred embodiments of the present disclosure have been described above, the scope of the present disclosure is not limited thereto, and various modifications and improvements made by those skilled in the art using the basic concept of the present disclosure defined in the accompanying claims fall within the scope of the present disclosure.

DESCRIPTION OF REFERENCE NUMERALS

1: Polymer electrolyte membrane
2: Organic-based antioxidant
3: Metal-based antioxidant
10, 10-1, 10-2: Porous supports
11, 11-1, 11-2: First layers
12, 12-1, 12-2: Second layers
20, 20-1, 20-2: First ion conductors
21, 21-1, 21-2: First ion conductor layers
30, 30-1, 30-2: Second ion conductors
31, 31-1, 31-2: Second ion conductor layers
20, 20': Electrodes
30, 30': Catalyst layers
40, 40': Electrode substrates
50: Polymer electrolyte membrane
100: Membrane-electrode assembly
200: Fuel cell
210: Fuel supply unit 220: Reforming unit
230: Stack 231: First supply pipe
232: Second supply pipe 233: First discharge pipe
234: Second discharge pipe 240: Oxidant supply unit

INDUSTRIAL APPLICABILITY

The present disclosure relates to a polymer electrolyte membrane, a method of manufacturing the same, and a membrane-electrode assembly including the same. The shape stability of the polymer electrolyte membrane is excellent, and the polymer electrolyte membrane has improved tolerance to radicals generated during the operation thereof. Consequently, the polymer electrolyte membrane exhibits high stability against radicals, i.e. high chemical stability. In addition, hydrogen permeability is reduced while the ion conductivity of the polymer electrolyte membrane is excellent.

The invention claimed is:

1. A polymer electrolyte membrane comprising:
a porous support having first and second surfaces opposite to each other, the porous support including a first portion having the first surface and a second portion having the second surface;
a first layer formed by filling first pores in the first portion of the porous support with a first ion conductor;
a second layer formed by filling second pores in the second portion of the porous support with a second ion conductor;
a first ion conductor layer on the first surface of the porous support, the first ion conductor layer comprising the first ion conductor; and
a second ion conductor on the second surface of the porous support, the second ion conductor layer comprising the second ion conductor,
wherein,
the first ion conductor has a lower equivalent weight (EW) than the second ion conductor,
a ratio of first thickness to second thickness is 9:1 to 6:4, the first thickness being a sum of a thickness of the first layer and a thickness of the first ion conductor layer, the second thickness being a sum of a thickness of the second layer and a thickness of the second ion conductor layer, and
one selected from a group consisting of the first layer, the second layer, and a combination thereof includes an antioxidant.

2. The polymer electrolyte membrane according to claim 1, wherein a weight per unit volume of the antioxidant in the first layer and a weight per unit volume of the antioxidant in the second layer are different from each other.

3. The polymer electrolyte membrane according to claim 2, wherein
the weight per unit volume of the antioxidant in one of the first and second layers which has larger weight per unit volume of the antioxidant than the other ranges from 30 mg/cm$^3$ to 4,000 mg/cm$^3$, and
the weight per unit volume of the antioxidant in the other of the first and second layers ranges from 10 mg/cm$^3$ to 2,000 mg/cm$^3$.

4. The polymer electrolyte membrane according to claim 1, wherein
the antioxidant is also included in the first and second ion conductor layers,
a weight per unit volume of the antioxidant in the first ion conductor layer is greater than a weight per unit volume of the antioxidant in the first layer, and
a weight per unit volume of the antioxidant in the second ion conductor layer is greater than a weight per unit volume of the antioxidant in the second layer.

5. The polymer electrolyte membrane according to claim 1, wherein
the antioxidant is also included in the first and second ion conductor layers,
a weight per unit volume of the antioxidant decreases or increases in an order of the first ion conductor layer, the first layer, the second layer, and the second ion conductor layer, so that the polymer electrolyte membrane has a concentration gradient of the antioxidant.

6. The polymer electrolyte membrane, wherein
one of the first and second layers includes an organic-based antioxidant, and
the other of the first and second layers does not include any antioxidant or includes a metal-based antioxidant.

7. The polymer electrolyte membrane according to claim 6, wherein the metal-based antioxidant is one capable of decomposing a peroxide or radical, which is selected from a group consisting of a transition metal, a noble metal, an ion thereof, a salt thereof, an oxide thereof, and a mixture thereof.

8. The polymer electrolyte membrane, wherein one selected from a group consisting of the first layer, the second layer, and a combination thereof includes an organic-based antioxidant selected from a group consisting of syringic acid, vanillic acid, protocatechuic acid, coumaric acid, caffeic acid, ferulic acid, chlorogenic acid, cynarine, gallic acid, and a mixture thereof.

9. The polymer electrolyte membrane, wherein
each of the first ion conductor and the second ion conductor is a fluorinated polymer comprising a fluorinated carbon backbone and a side chain represented by Chemical Formula 1 below, and
the first ion conductor and the second ion conductor have different side-chain lengths,

[Chemical Formula 1]

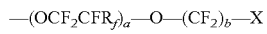

—$(OCF_2CFR_f)_a$—O—$(CF_2)_b$—X in Chemical Formula 1 above,
$R_f$ is respectively and independently one selected from a group consisting of F, Cl, and a perfluorinated alkyl group having a carbon number ranging from 1 to 10,
X is an ion-exchanging group,
a is a real number ranging from 0 to 3, and
b is a real number ranging from 1 to 5.

10. The polymer electrolyte membrane according to claim 1, wherein
each of the first ion conductor and the second ion conductor is a polymer comprising a hydrophilic repeating unit and a hydrophobic repeating unit, and
the first ion conductor and the second ion conductor have different molar ratios of the hydrophilic repeating unit to the hydrophobic repeating unit.

11. The polymer electrolyte membrane according to claim 10, wherein the molar ratio of the hydrophilic repeating unit to the hydrophobic repeating unit of the first ion conductor is higher than the molar ratio of the hydrophilic repeating unit to the hydrophobic repeating unit of the second ion conductor.

12. A membrane-electrode assembly comprising:
an anode;
a cathode; and
the polymer electrolyte membrane according to claim 1, the polymer electrolyte membrane being disposed between the anode and the cathode.

13. A fuel cell comprising the membrane-electrode assembly according to claim 12.

14. A method of manufacturing a polymer electrolyte membrane, the method comprising:
preparing a porous support having first and second surfaces opposite to each other, the porous support including a first portion having the first surface and a second portion having the second surface;
filling first pores in the first region of the porous support with a first ion conductor to form a first layer;
forming a first ion conductor layer on the first surface of the porous support with the first ion conductor;
filling second pores in the second region of the porous support with a second ion conductor to form a second layer; and
forming a second ion conductor layer on the second surface of the porous support with the second ion conductor, wherein
the first ion conductor has a lower equivalent weight (EW) than the second ion conductor,
a ratio of first thickness to second thickness is 9:1 to 6:4, the first thickness being a sum of a thickness of the first layer and a thickness of the first ion conductor layer, the second thickness being a sum of a thickness of the second layer and a thickness of the second ion conductor layer, and
one selected from a group consisting of the first layer, the second layer, and a combination thereof includes an antioxidant.

* * * * *